US011982972B2

(12) United States Patent
Miyamoto et al.

(10) Patent No.: US 11,982,972 B2
(45) Date of Patent: May 14, 2024

(54) PHOTOSENSITIVE MEMBER CARTRIDGE AND PROCESS CARTRIDGE

(71) Applicant: CANON KABUSHIKI KAISHA, Tokyo (JP)

(72) Inventors: Jun Miyamoto, Mishima (JP); Masao Uyama, Mishima (JP); Kenji Matsuda, Numazu (JP); Ken Kikuchi, Mishima (JP); Jun Miyazaki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/978,513

(22) Filed: Nov. 1, 2022

(65) Prior Publication Data

US 2023/0052164 A1 Feb. 16, 2023

Related U.S. Application Data

(62) Division of application No. 17/702,912, filed on Mar. 24, 2022, now Pat. No. 11,789,403, which is a (Continued)

(30) Foreign Application Priority Data

May 29, 2015 (JP) ................................ 2015-109757

(51) Int. Cl.
*G03G 21/18* (2006.01)
*G03G 15/08* (2006.01)
*G03G 21/16* (2006.01)

(52) U.S. Cl.
CPC ..... *G03G 21/1814* (2013.01); *G03G 15/0863* (2013.01); *G03G 21/1652* (2013.01); *G03G 21/1821* (2013.01); *G03G 21/1885* (2013.01)

(58) Field of Classification Search
CPC ........... G03G 21/1814; G03G 15/0863; G03G 21/1652; G03G 21/1821; G03G 21/1885
See application file for complete search history.

(56) References Cited

U.S. PATENT DOCUMENTS 5,528,341 A 6/1996 Shishido et al.
5,642,187 A 6/1997 Nomura et al.
(Continued)

FOREIGN PATENT DOCUMENTS

JP H09-120247 A 5/1997
JP H09-179476 A 7/1997
(Continued)

OTHER PUBLICATIONS

Office Action in Indian Patent Application No. 4840/CHENP/2014, dated Jun. 25, 2018.

(Continued)

*Primary Examiner* — Sandra Brase
(74) *Attorney, Agent, or Firm* — Venable LLP

(57) ABSTRACT

A photosensitive member cartridge detachably mountable to a main assembly of an image forming apparatus for forming an image, includes a frame; a photosensitive drum on which and which is provided in the frame; a transfer member for transferring an image formed on the drum onto the sheet; a mounting portion for detachably mounting a developing cartridge including a developer carrying member onto the drum and a memory for storing information; a first electrical contact provided on the frame and electrically connectable with a main assembly electrical contact provided in the main assembly when the cartridge is mounted to the main assembly; and a second electrical contact provided on the frame for electrically connecting the memory and the first electrical contact portion with each other when the developing cartridge is mounted to the mounting portion.

4 Claims, 17 Drawing Sheets

Related U.S. Application Data division of application No. 17/102,530, filed on Nov. 24, 2020, now Pat. No. 11,314,198, which is a division of application No. 16/802,860, filed on Feb. 27, 2020, now Pat. No. 11,156,953, which is a division of application No. 16/056,756, filed on Aug. 7, 2018, now Pat. No. 10,599,094, which is a division of application No. 15/610,752, filed on Jun. 1, 2017, now Pat. No. 10,191,446, which is a division of application No. 15/166,316, filed on May 27, 2016, now Pat. No. 9,823,621.

(56) References Cited

U.S. PATENT DOCUMENTS

| | | | |
|---|---|---|---|
| 5,650,841 | A | 7/1997 | Matsuda et al. |
| 5,678,139 | A | 10/1997 | Nomura et al. |
| 5,697,022 | A | 12/1997 | Matsuda et al. |
| 5,825,472 | A | 10/1998 | Araki et al. |
| 5,867,751 | A | 2/1999 | Nomura et al. |
| 5,937,239 | A | 8/1999 | Watanabe et al. |
| 5,946,531 | A | 8/1999 | Miura et al. |
| 5,950,047 | A | 9/1999 | Miyabe et al. |
| 6,002,896 | A | 12/1999 | Miyamoto et al. |
| 6,016,408 | A | 1/2000 | Hashimoto et al. |
| 6,055,406 | A | 4/2000 | Kawai et al. |
| 6,061,538 | A | 5/2000 | Arimitsu et al. |
| 6,101,352 | A | 8/2000 | Hashimoto et al. |
| 6,151,459 | A | 11/2000 | Hashimoto et al. |
| 6,167,219 | A | 12/2000 | Miyamoto et al. |
| 6,272,300 | B1 | 8/2001 | Fujuwara et al. |
| 6,282,390 | B1 | 8/2001 | Miyabe et al. |
| 6,324,370 | B1 | 11/2001 | Isobe et al. |
| 6,336,017 | B1 | 1/2002 | Miyamoto et al. |
| 6,496,664 | B1 | 12/2002 | Ogata et al. |
| 6,505,007 | B2 | 1/2003 | Miura et al. |
| 6,553,189 | B2 | 4/2003 | Miyamoto et al. |
| 6,564,029 | B2 | 5/2003 | Kojima et al. |
| 6,735,405 | B2 | 5/2004 | Yokoi et al. |
| 6,798,099 | B1 | 9/2004 | Doe |
| 6,832,057 | B2 | 12/2004 | Oguma et al. |
| 6,834,175 | B2 | 12/2004 | Murayama et al. |
| 6,859,629 | B2 | 2/2005 | Miura et al. |
| 6,873,815 | B2 | 3/2005 | Matsuda et al. |
| 6,922,539 | B2 | 7/2005 | Uyama et al. |
| 6,952,544 | B2 | 10/2005 | Kikuchi et al. |
| 6,968,147 | B2 | 11/2005 | Matsuda et al. |
| 6,980,755 | B2 | 12/2005 | Numagami et al. |
| 7,073,251 | B2 | 7/2006 | Kikuchi et al. |
| 7,079,787 | B2 | 7/2006 | Ogino et al. |
| 7,200,350 | B2 | 4/2007 | Agata et al. |
| 7,277,659 | B2 | 10/2007 | Kobayashi et al. |
| 7,296,341 | B2 | 11/2007 | Kikuchi et al. |
| 7,613,414 | B2 | 11/2009 | Kamimura |
| 7,813,670 | B2 | 10/2010 | Matsuda |
| 7,817,936 | B2 | 10/2010 | Kikuchi et al. |
| 7,840,154 | B2 | 11/2010 | Ishii et al. |
| 7,983,597 | B2 | 7/2011 | Kikuchi |
| 8,000,630 | B2 | 8/2011 | Matsuda |
| 8,073,360 | B2 | 12/2011 | Kikuchi |
| 8,260,171 | B2 | 9/2012 | Matsuda |
| 8,396,380 | B2 | 3/2013 | Kikuchu et al. |
| 8,452,208 | B2 | 5/2013 | Kikuchi |
| 8,463,156 | B2 | 6/2013 | Akutsu et al. |
| 8,483,594 | B2 | 7/2013 | Akutsu et al. |
| 8,521,041 | B2 | 8/2013 | Kojima et al. |
| 8,548,354 | B2 | 10/2013 | Kikuchi |
| 8,565,638 | B2 | 10/2013 | Kikuchi et al. |
| 8,565,642 | B2 | 10/2013 | Matsuda |
| 8,571,440 | B2 | 10/2013 | Akutsu et al. |
| 8,606,143 | B2 | 12/2013 | Kikuchi |
| 8,626,008 | B2 | 1/2014 | Kikuchi et al. |
| 8,644,732 | B2 | 2/2014 | Kikuchi et al. |
| 8,768,208 | B2 | 7/2014 | Akutsu et al. |
| 8,787,794 | B2 | 7/2014 | Miyazaki et al. |
| 8,929,722 | B2 | 1/2015 | Kikuchi |
| 8,938,187 | B2 | 1/2015 | Fukamachi |
| 9,140,069 | B2 | 9/2015 | Schultz et al. |
| 9,256,157 | B2 | 2/2016 | Tokundome et al. |
| 9,354,596 | B2 | 5/2016 | Kikuchi |
| 9,360,832 | B2 | 6/2016 | Kikuchi |
| 9,823,621 | B2 | 11/2017 | Miyamoto et al. |
| 10,191,446 | B2 | 1/2019 | Mitamoto et al. |
| 10,599,094 | B2 | 3/2020 | Miyamoto et al. |
| 2002/0028088 | A1 | 3/2002 | Okabe et al. |
| 2004/0184834 | A1 | 9/2004 | Blaine et al. |
| 2005/0053394 | A1 | 3/2005 | Ishii et al. |
| 2007/0009281 | A1 | 1/2007 | Sato et al. |
| 2007/0092291 | A1 | 4/2007 | Suzuki et al. |
| 2007/0140725 | A1 | 6/2007 | Kamimura |
| 2008/0199204 | A1 | 8/2008 | Ishii et al. |
| 2008/0240774 | A1 | 10/2008 | Fukumachi et al. |
| 2012/0039622 | A1 | 2/2012 | Cho |
| 2013/0051849 | A1 | 2/2013 | Itabashi et al. |
| 2013/0051851 | A1 | 2/2013 | Fukamachi |
| 2015/0378302 | A1 | 12/2015 | Kikuchi et al. |
| 2016/0349697 | A1 | 12/2016 | Wei et al. |
| 2016/0349699 | A1 | 12/2016 | Miyamoto et al. |
| 2017/0261923 | A1 | 9/2017 | Miyamoto et al. |
| 2020/0192276 | A1 | 6/2020 | Miyamoto et al. |
| 2021/0080901 | A1 | 3/2021 | Miyamoto et al. |

FOREIGN PATENT DOCUMENTS

| | | | |
|---|---|---|---|
| JP | H11-52817 | A | 2/1999 |
| JP | 2006-235656 | | 9/2006 |
| JP | 2007-093753 | | 4/2007 |
| JP | 2008-203566 | A | 9/2008 |
| JP | 2008-249802 | A | 10/2008 |
| JP | 2013-050493 | | 3/2013 |
| JP | 2016-224221 | | 12/2016 |
| JP | 6590534 | B2 | 10/2019 |
| WO | 2008/087736 | A1 | 3/2008 |
| WO | 2008/072431 | A1 | 6/2008 |

OTHER PUBLICATIONS

Feb. 19, 2019 Office Action in Japanese Patent Applicaiton No. 2015-109757.

Office Action dated Sep. 29, 2020 in counterpart Japanese Patent Application No. 2019-168982 (with English translation).

(a)

(b)

PHOTOSENSITIVE MEMBER CARTRIDGE AND PROCESS CARTRIDGE

FIELD OF THE INVENTION AND RELATED ART

The present invention relates to a photosensitive member cartridge and a process cartridge.

In an image forming apparatus such as a laser printer and a digital copying machine, which uses an electrophotographic image formation process, an electrostatic latent image is formed on the peripheral surface of the photosensitive drum of the apparatus, by the scanning of the peripheral surface of the photosensitive drum with a beam of laser light projected upon the drum while being modulated with the data of an image to be printed. Then, a visible image is formed on the peripheral surface of the photosensitive drum by supplying the electrostatic image with toner. Then, the visible image is transferred onto a sheet of recording medium. Then, the visible image is thermally fixed to the sheet.

A cartridge which is removably installable in the main assembly of an image forming apparatus is provided with a storing means (memory), in which information for replacing the cartridge with proper timing, for example, the amount, or the like, of toner remaining in the cartridge, is stored. From the standpoint of performance and cost, an IC chip of the so-called contact type is employed as the storing means (memory).

An image forming apparatus is provided with a controlling section, which is in electrical connection to the electrical contacts of the main assembly of the apparatus. The storing means (memory) is in electrical connection to the electrical contact with which the cartridge is provided. The image forming apparatus and cartridge are structured so that as the cartridge is installed into the main assembly of the apparatus, the electrical contacts of the cartridge come into contact with the electrical contacts of the main assembly of the apparatus, so that the controlling section can obtain the information in the storing means (memory) to properly control the image forming apparatus. In order for the storing means (memory) to normally function, it is necessary for the electrical contacts of the cartridge to remain in contact with the electrical contacts of the main assembly.

There is disclosed in Japanese Laid-open Patent Application No. H09-179476, a mechanism which can ensure that as a process cartridge is installed into the main assembly of an image forming apparatus, in the direction which is intersectional to the axial line of the photosensitive drum in the process cartridge, the storing means (memory) attached to the process cartridge comes into contact with the electrical contacts of the main assembly.

However, in a case where a process cartridge comprises a photosensitive member cartridge and a development cartridge, and also, where the development cartridge is removably installable into the photosensitive member cartridge and has a storing means (memory), has the following issue. That is, in order to ensure that as the development cartridge is installed into the photosensitive member cartridge, electrical connection is established between the storing means (memory) with which the development cartridge is provided, and the electrical contacts of the main assembly of the apparatus, the image forming apparatus and process cartridge have to be structured so that as the process cartridge is installed into the main assembly of the apparatus, the photosensitive member cartridge (housing) is not between the electrical contacts of the development cartridge and the electrical contact of the main assembly. Thus, a setup such as the above described one makes the electrical contacts of the main assembly complicated in structure, and also, larger.

SUMMARY OF THE INVENTION

One of the objects of the present invention is to provide a photosensitive member cartridge and a process cartridge which do not require the electrical contacts of the main assembly of an image forming apparatus to be complicated and increased in size. Another object of the present invention is to further develop at least one among a photosensitive member cartridge, a development cartridge, and a process cartridge.

According to an aspect of the present invention, there is provided a photosensitive member cartridge detachably mountable to a main assembly of an image forming apparatus for forming an image on a sheet, said photosensitive member cartridge comprising a frame; a photosensitive member on which a latent image is to be formed and which is provided in said frame; a transfer member configured to transfer an image formed on said photosensitive member onto the sheet; a mounting portion configured to detachably mounted a developing cartridge including a developer carrying member configured to supply the developer onto said photosensitive member and memory means configured to store information; a first electrical contact portion provided on said frame and electrically connectable with a main assembly electrical contact portion provided in the main assembly when said photosensitive member cartridge is mounted to the main assembly; and a second electrical contact portion provided on said frame and configured to electrically connect said memory means and said first electrical contact portion with each other when said developing cartridge is mounted to said mounting portion.

According to another aspect of the present invention, there is provided a process cartridge detachably mountable to a main assembly of an image forming apparatus for forming an image on a sheet, said photosensitive member cartridge comprising: a photosensitive member cartridge including a frame, a photosensitive member and which a latent image is to be formed and which is provided in said frame, a transfer member configured to transfer an image formed on said photosensitive member onto the sheet, and a mounting portion for mounting a developing cartridge; a developing cartridge including a developer carrying member configured to supply the developer onto said photosensitive member and memory means configured to store information, said developing cartridge is detachably mounted to said mounting portion; a first electrical contact portion provided on said frame and electrically connectable with a main assembly electrical contact portion provided in the main assembly when said photosensitive member cartridge is mounted to the main assembly; and a second electrical contact portion provided on said frame and configured to electrically connect said memory means and said first electrical contact portion with each other when said developing cartridge is mounted to said mounting portion.

Further features of the present invention will become apparent from the following description of exemplary embodiments with reference to the attached drawings.

Figure 4A:
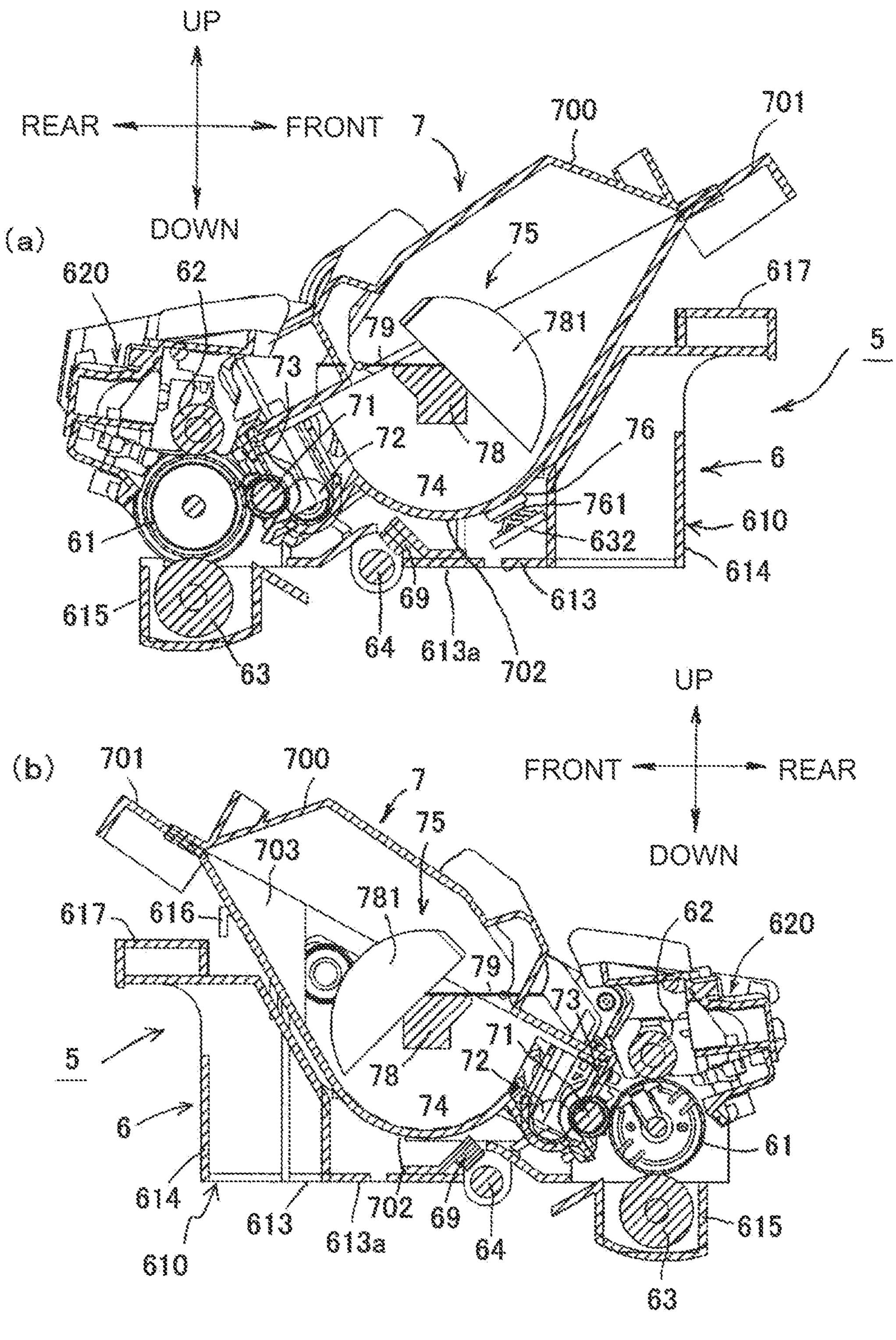

Parts (a) and (b) of FIG. 4A are sectional views of the process cartridge, at a plane which is perpendicular to the lengthwise direction of the cartridge. It shows the structure of the cartridge.

Figure 4B:
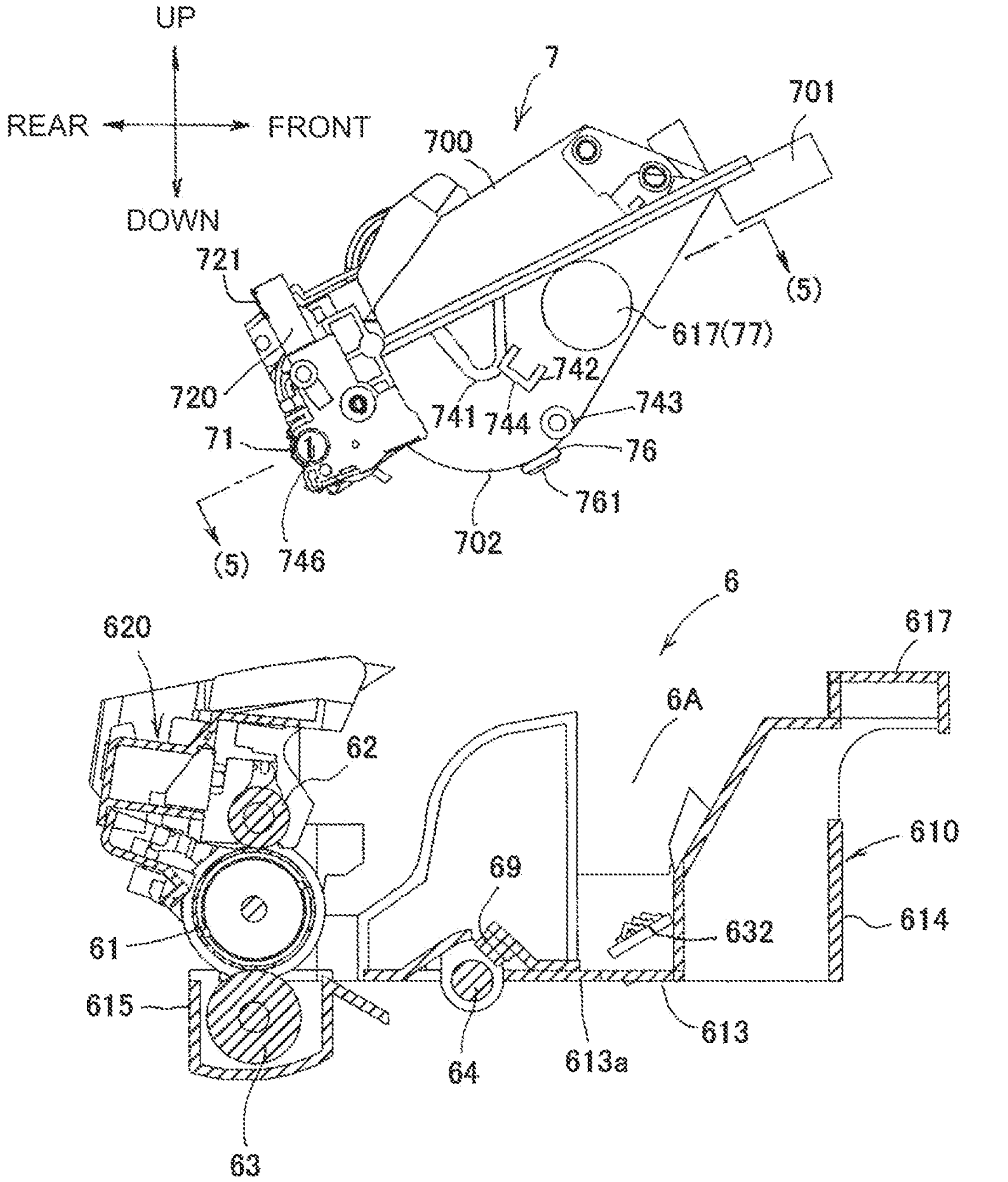

FIG. 4B is sectional views of the process cartridge, at a plane which is perpendicular to the lengthwise direction of the cartridge, when its development cartridge is out of its photosensitive member cartridge.

Figure 5:
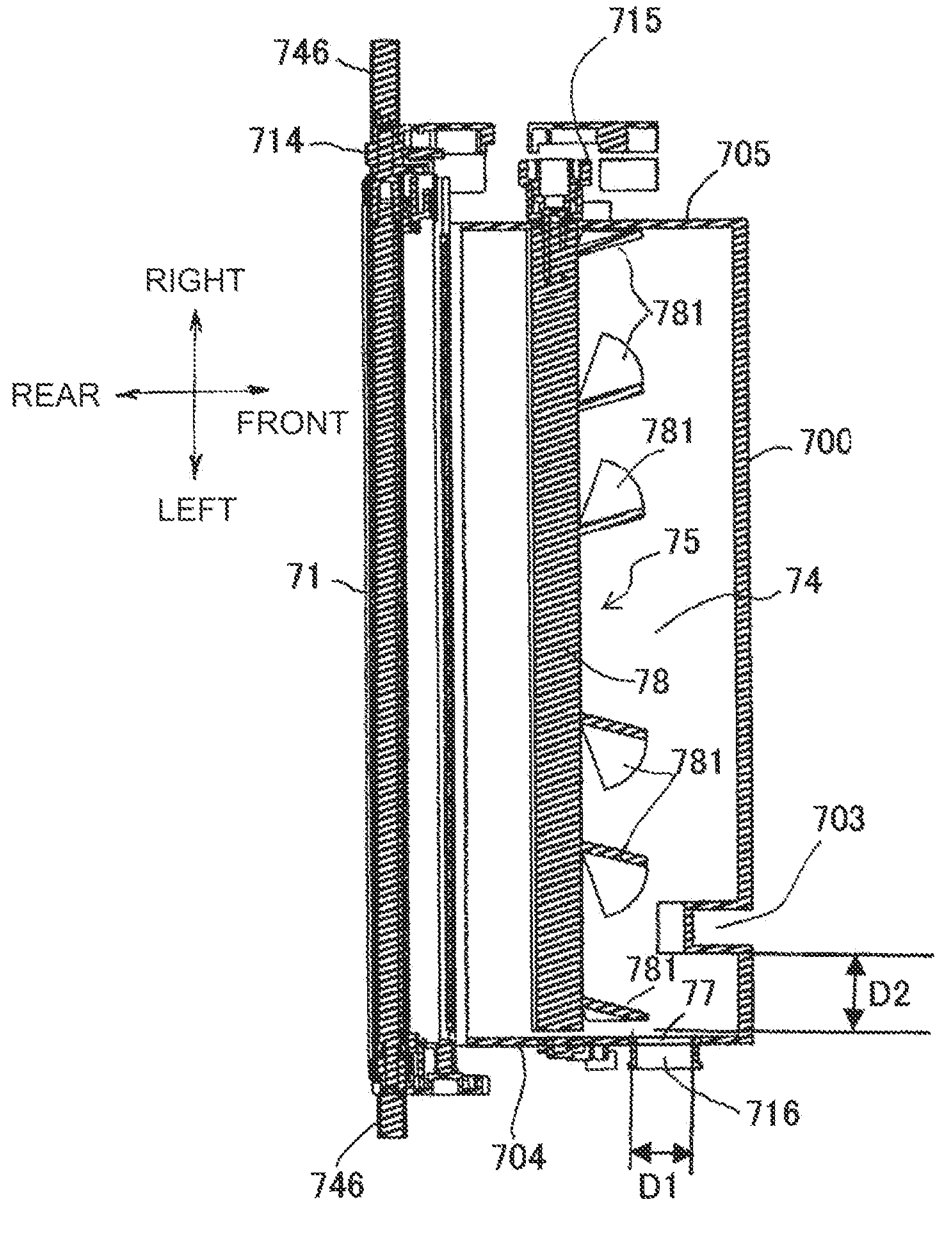

FIG. 5 is a sectional view of the process cartridge, at a plane (5)-(5) in FIG. 4B.

Figure 6:
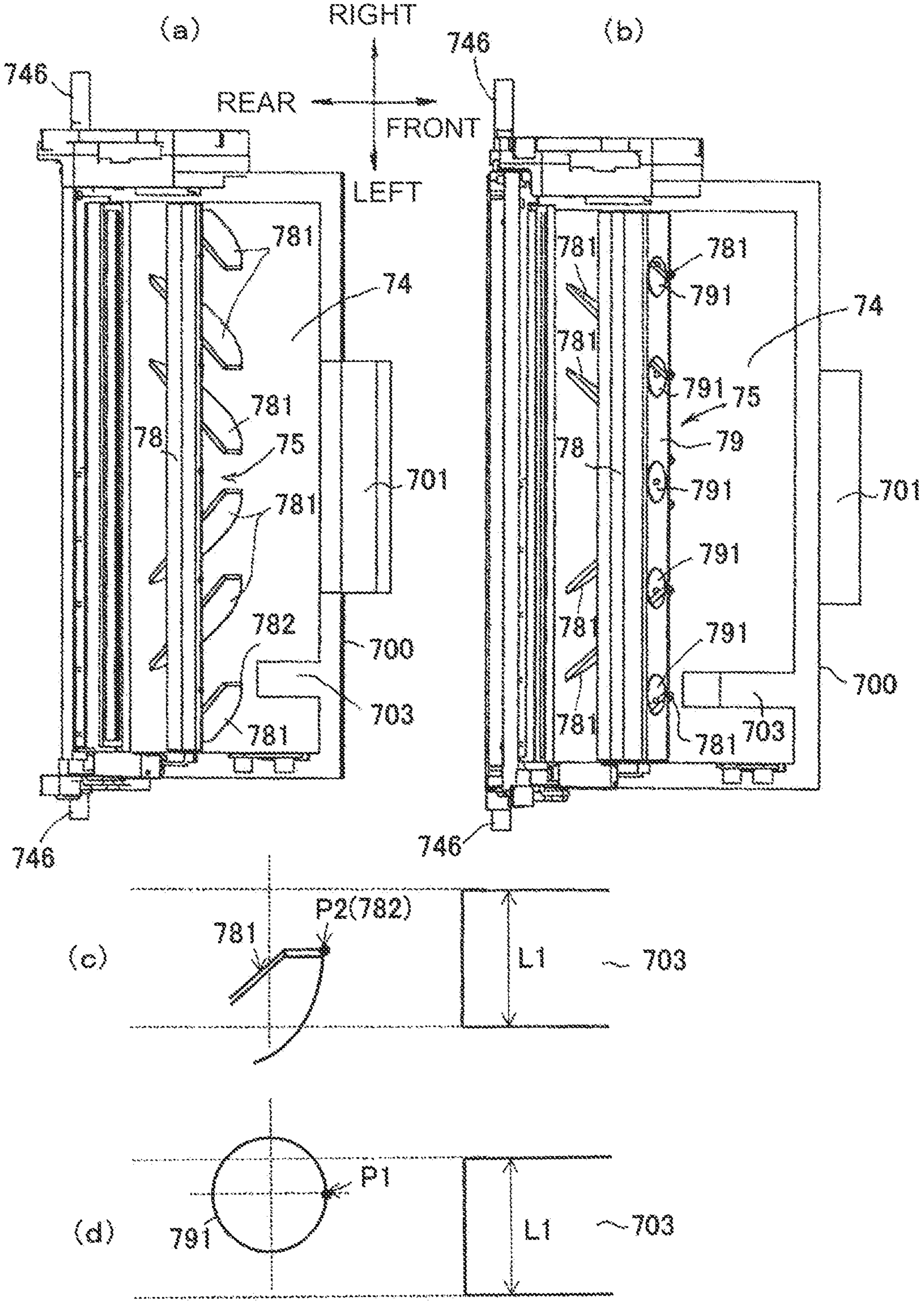

FIG. 6 is a schematic drawing for describing the stirring member of the development cartridge. It describes the structure of the stirring member.

Figure 7:
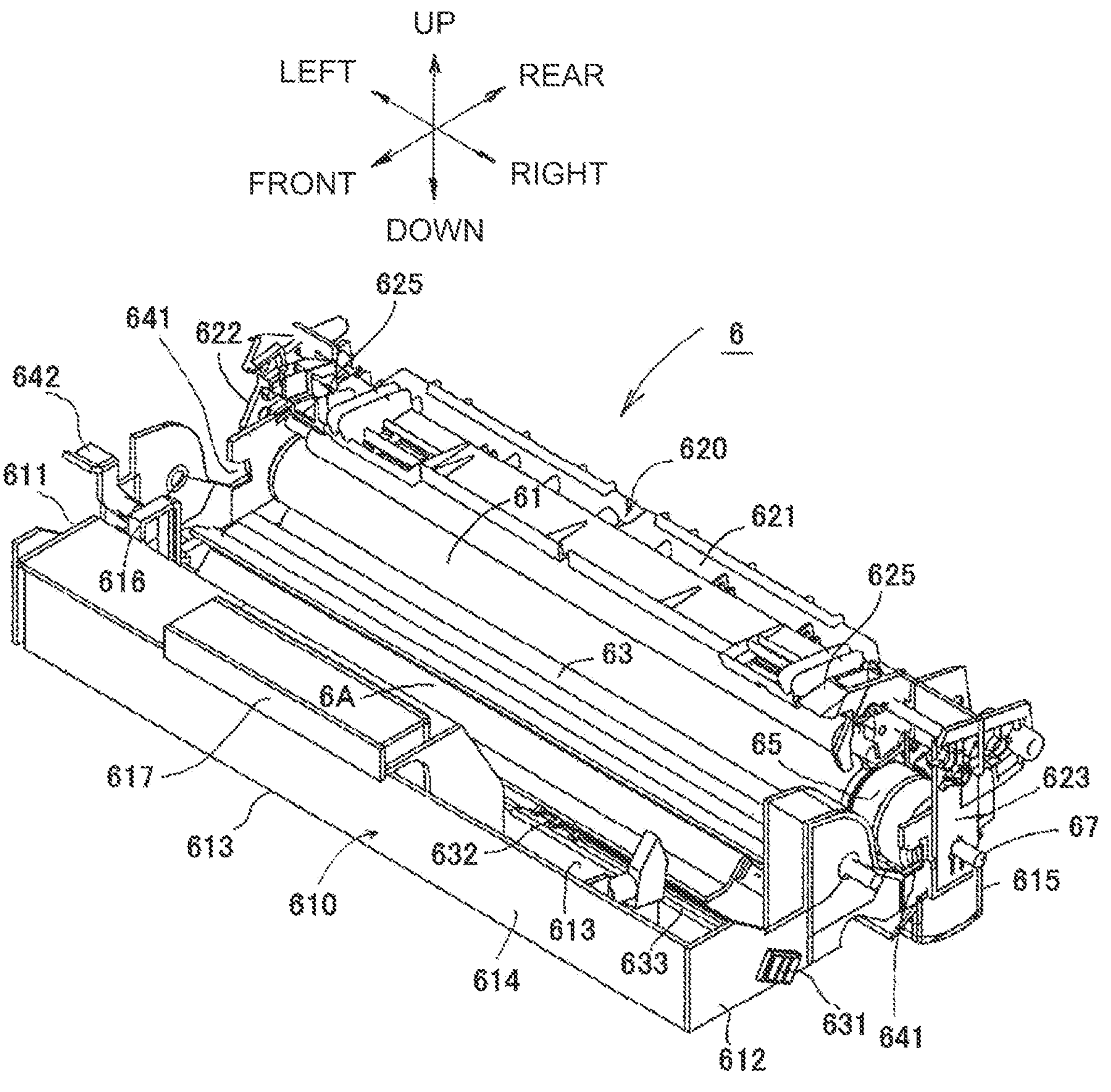

FIG. 7 is a perspective view of the photosensitive member cartridge.

Figure 8:
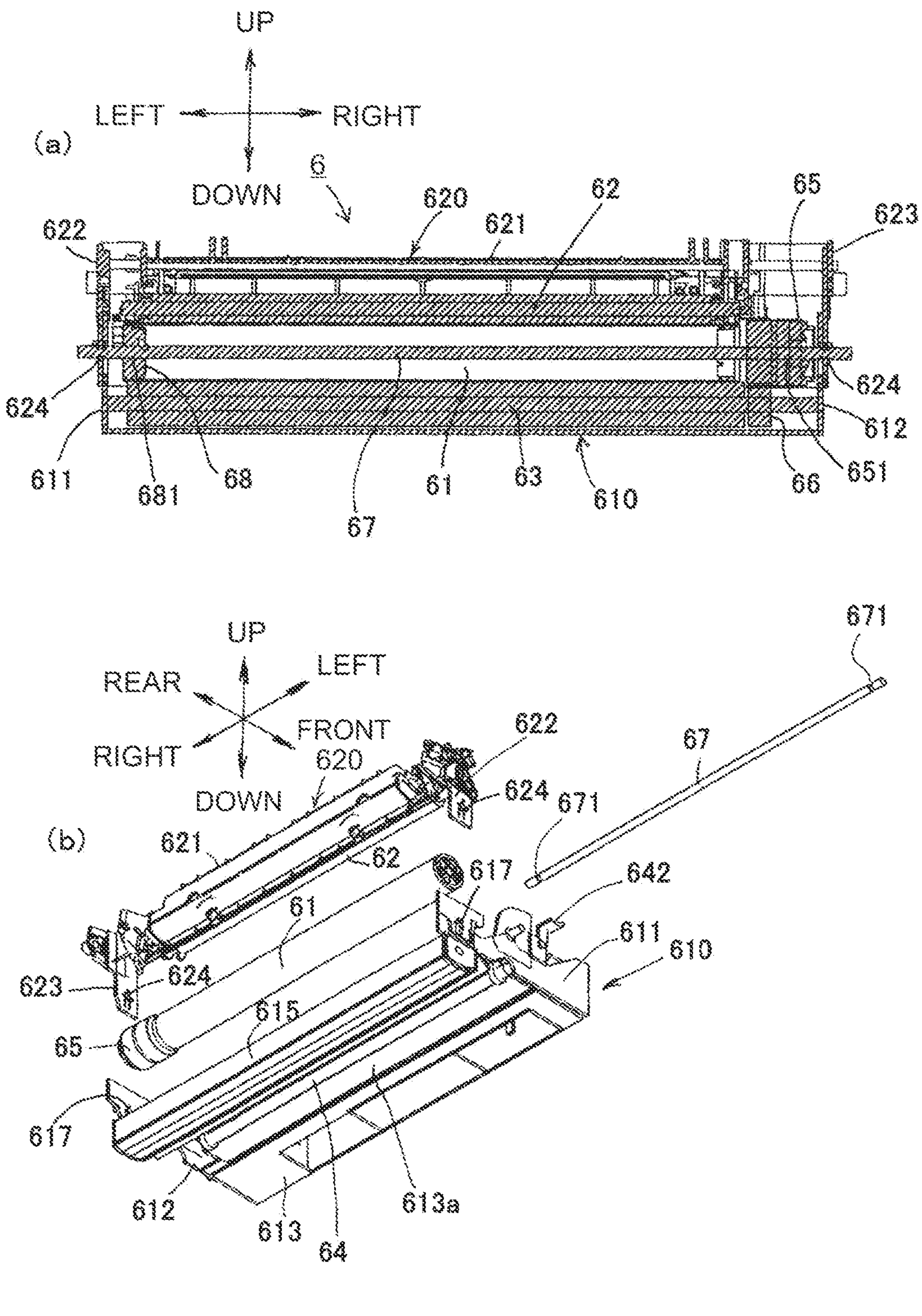

FIG. 8 parts (a) and (b) are drawings for describing the method for assembling the photosensitive member cartridge.

Figure 9:
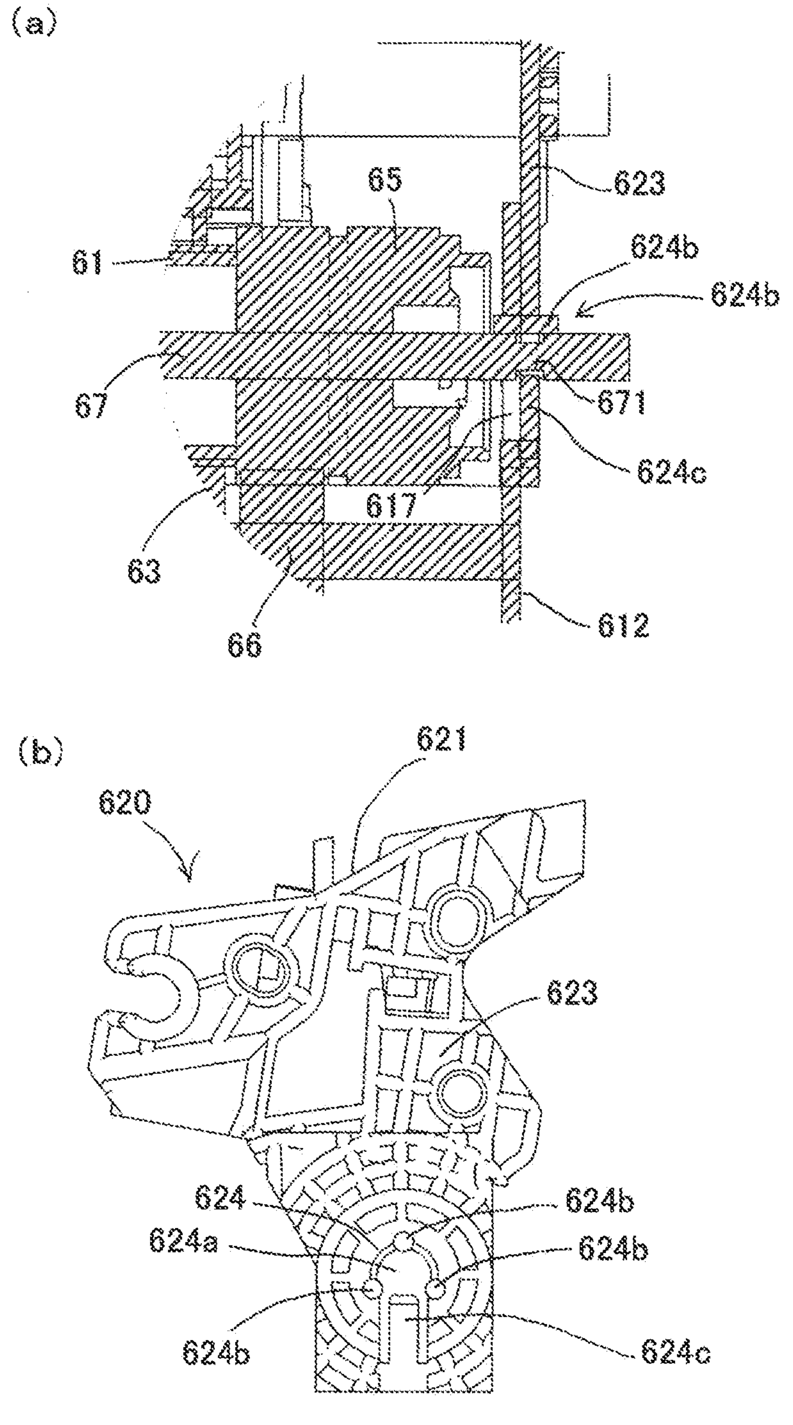

FIG. 9 parts (a) and (b) are drawings for describing the method for assembling the photosensitive member cartridge.

Figure 10:
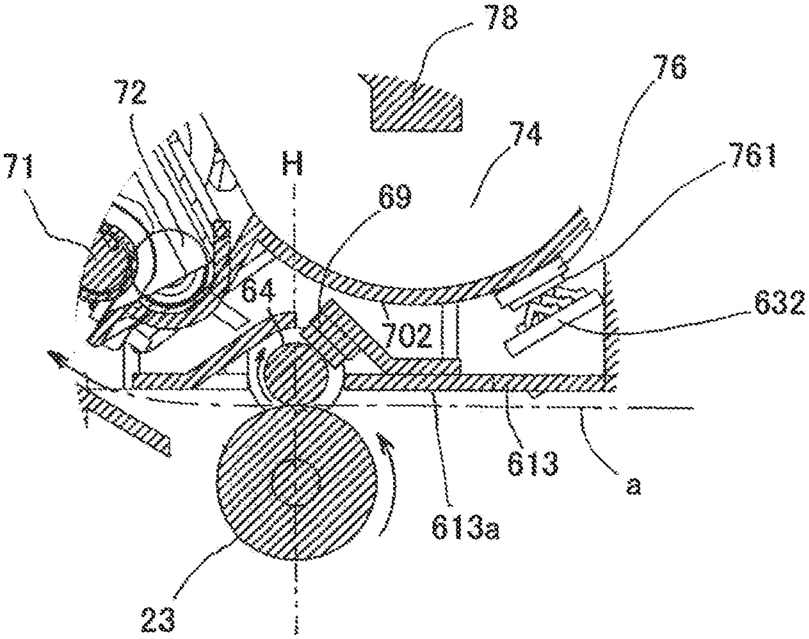
Figure 10:
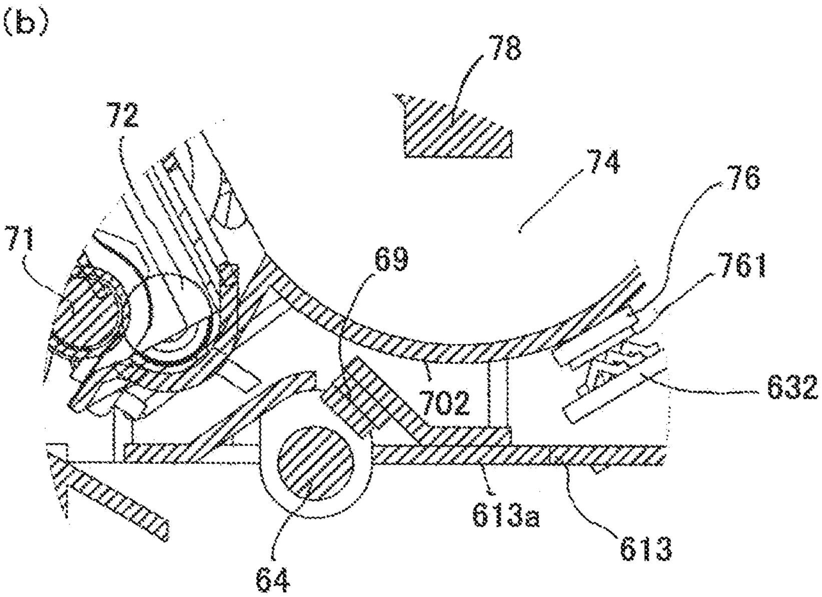

FIG. 10 parts (a) and (b) are schematic drawings for describing the paper dust removing member.

Figure 11:
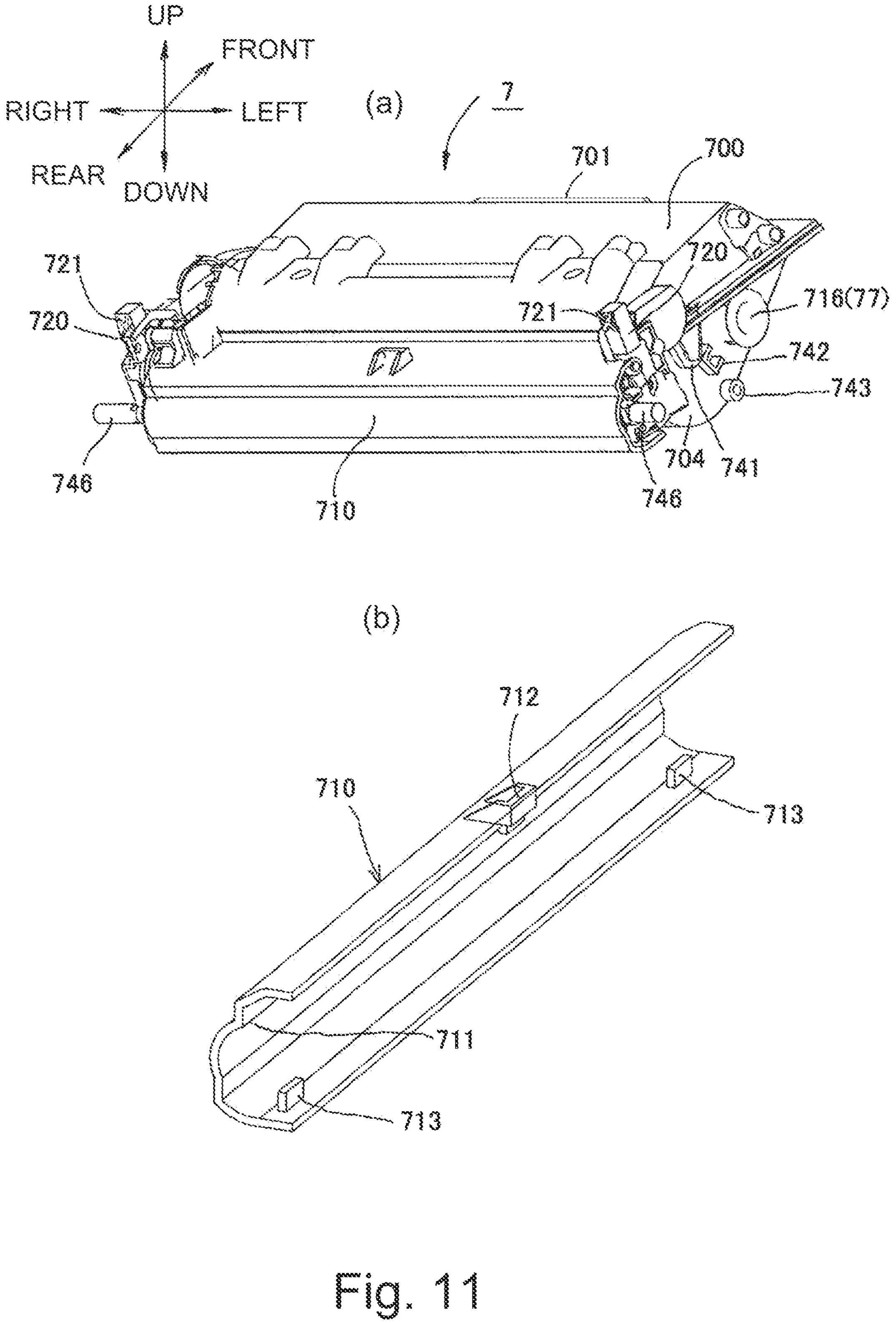

FIG. 11 parts (a) and (b) are drawings for describing the development roller cover.

Figure 12:
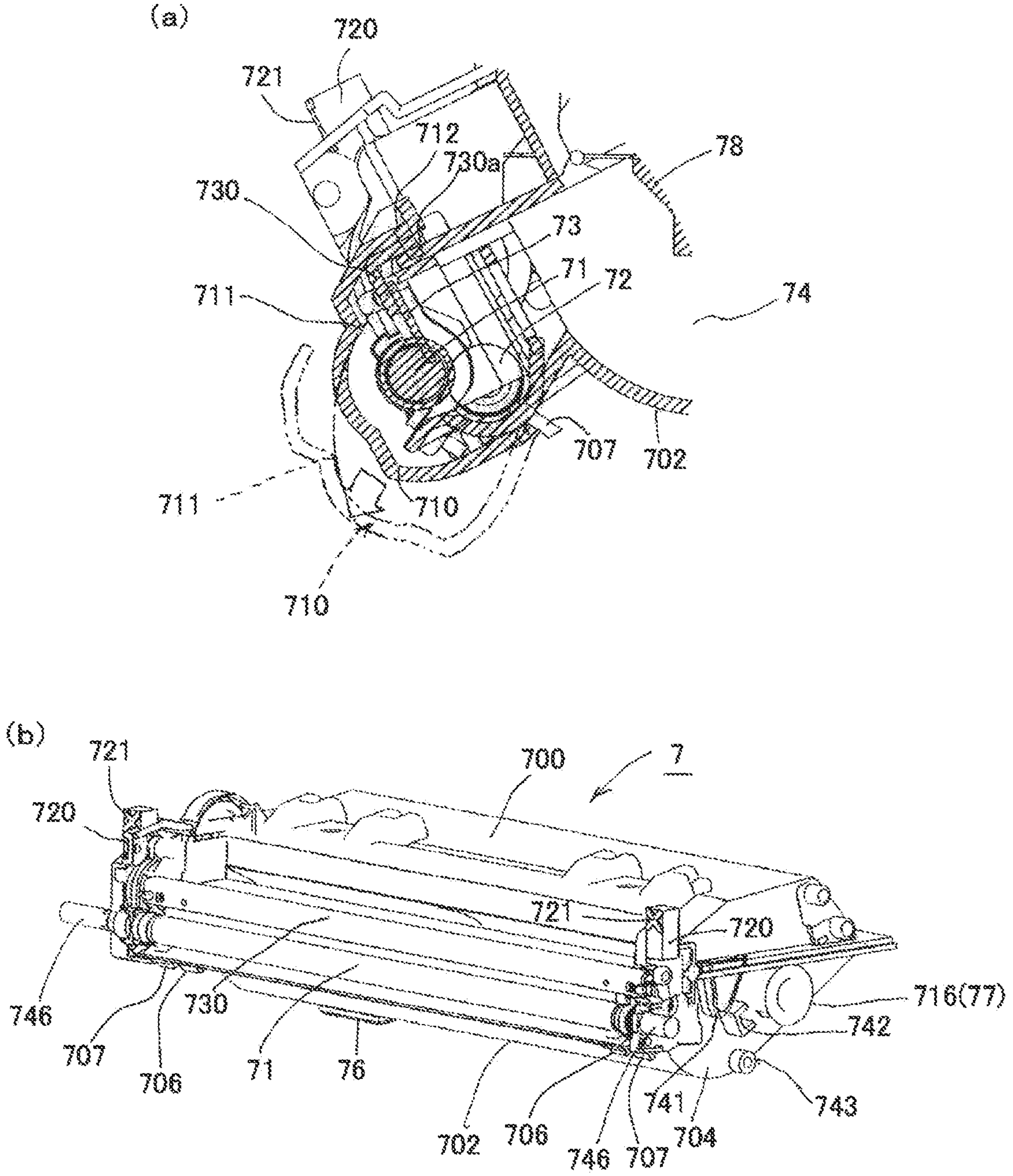

FIG. 12 parts (a) and (b) are drawings for describing the development roller cover.

Figure 13:
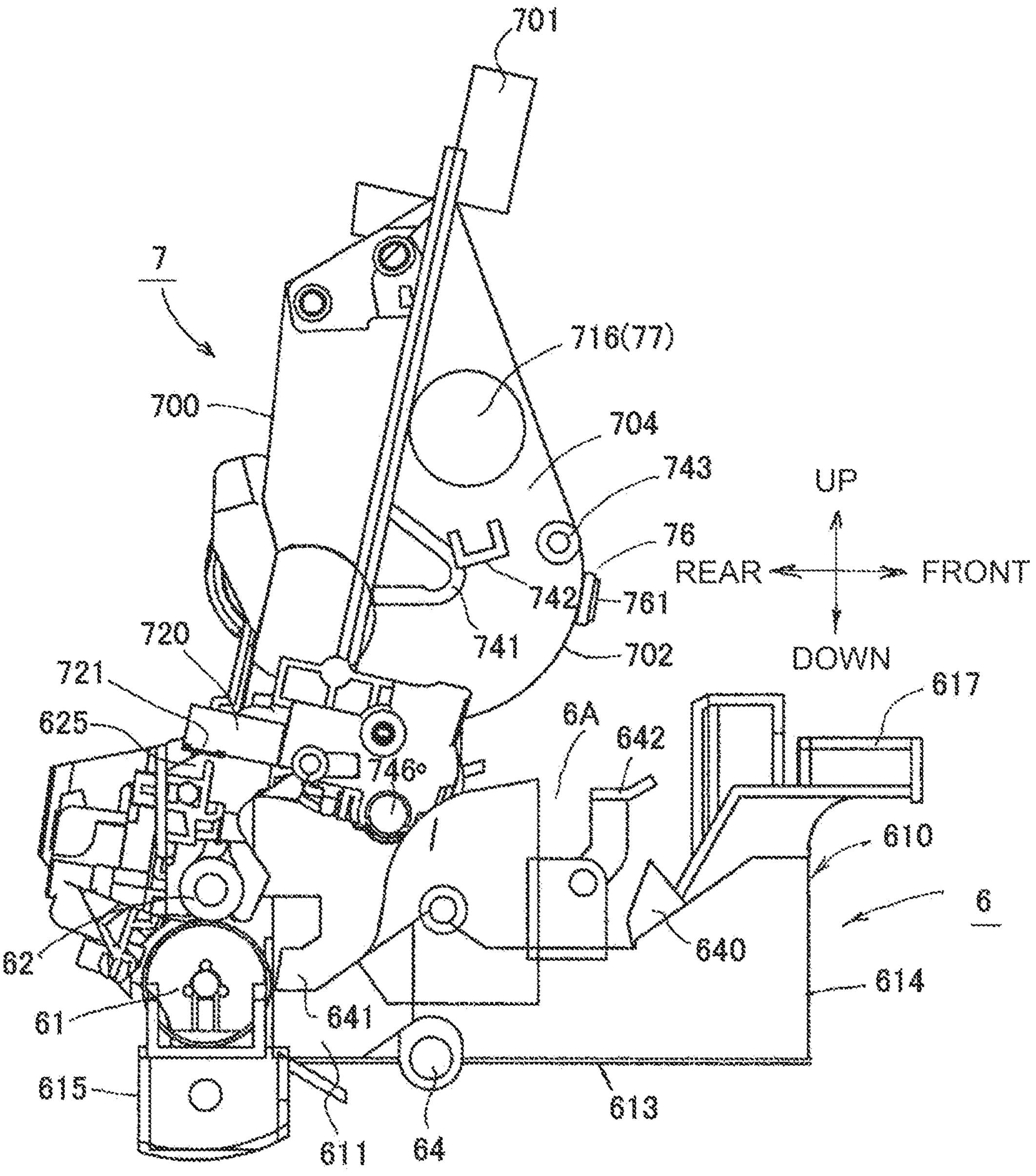

FIG. 13 is a drawing for describing the method for installing the development cartridge into the photosensitive member cartridge.

Figure 14:
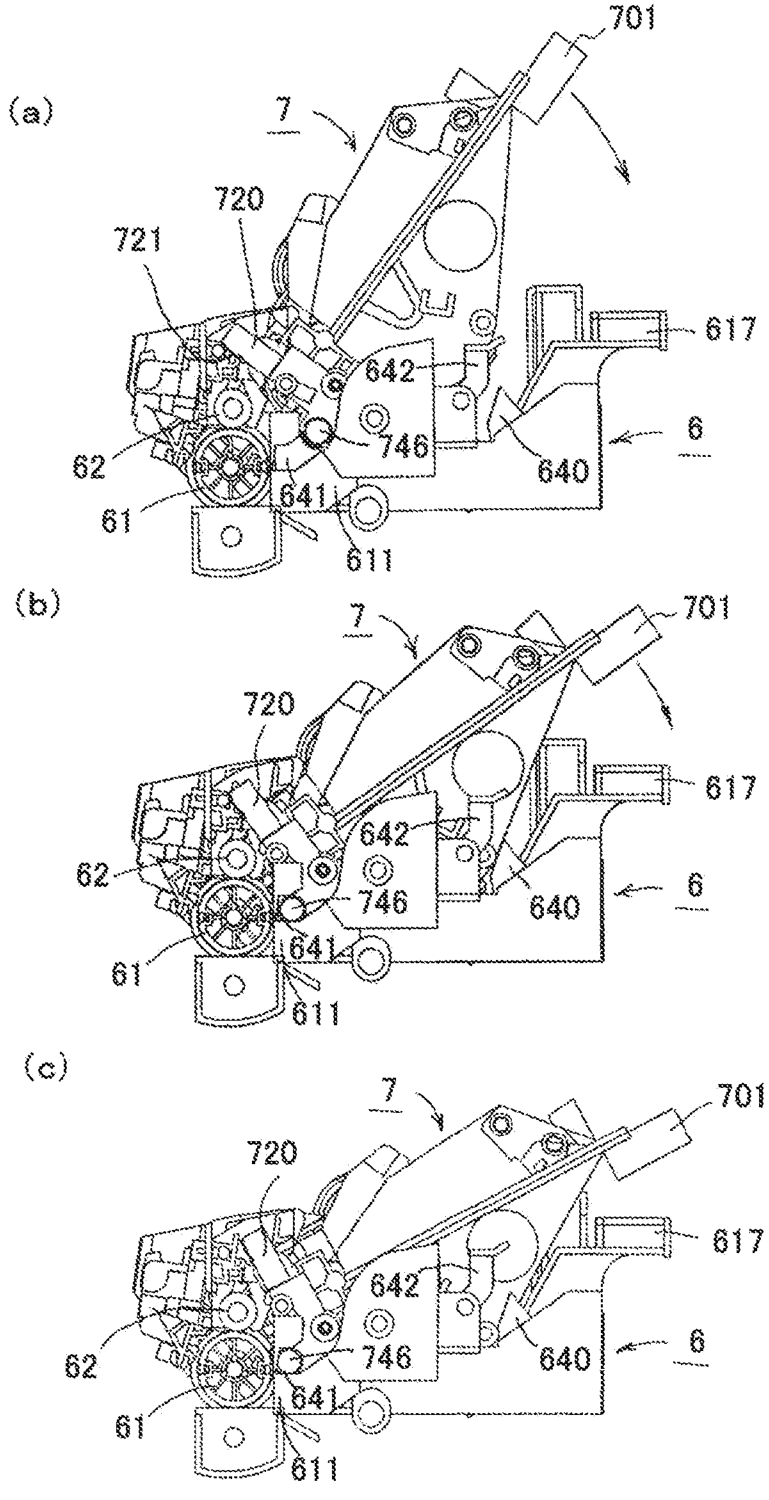

FIG. 14 parts (a), (b), and (c) are drawings for describing the method for installing the development cartridge into the photosensitive member cartridge.

Figure 15:
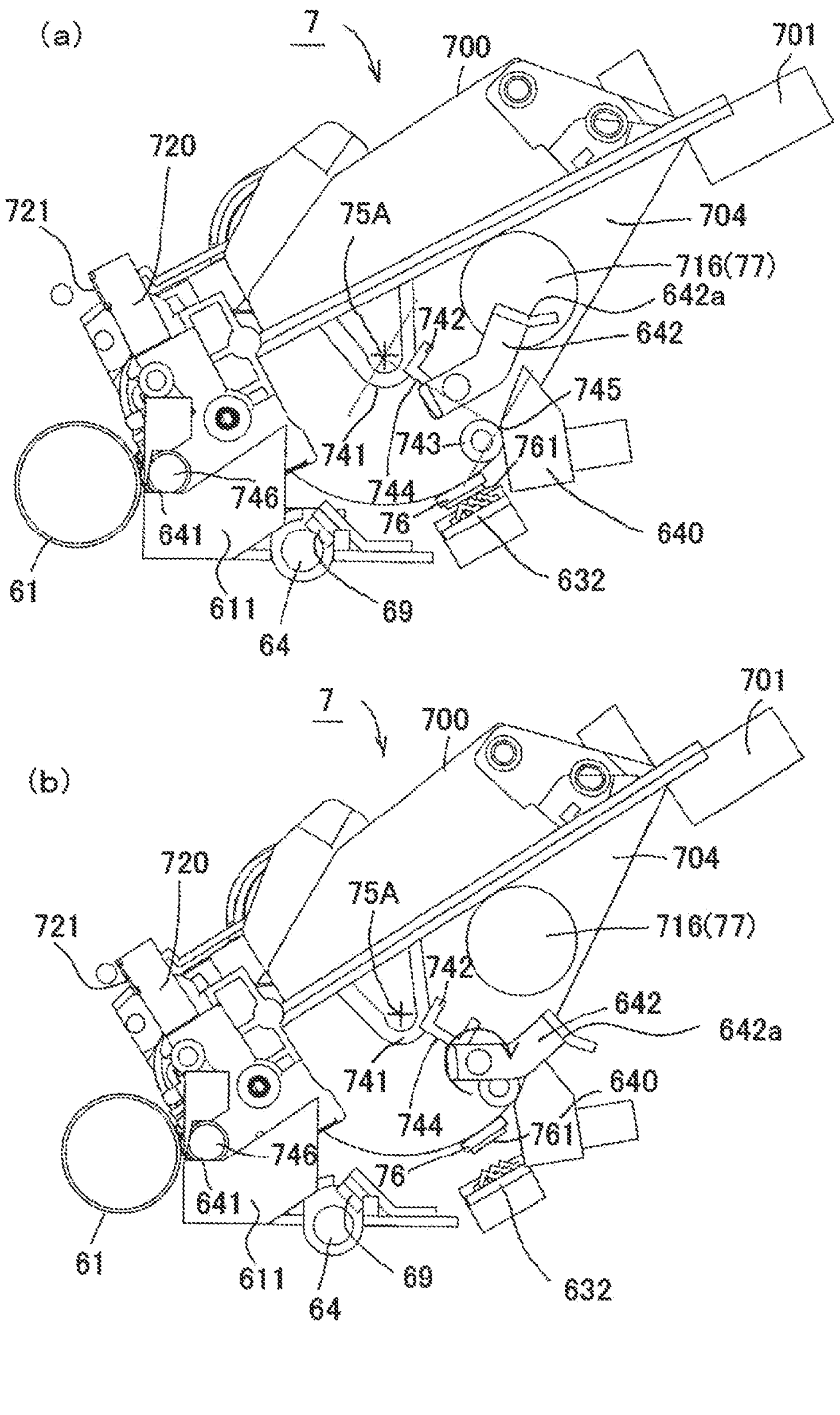

FIG. 15 parts (a) and (b) are drawings for describing the method for installing the development cartridge into the photosensitive member cartridge, and also, the method for uninstalling the development cartridge from the photosensitive member cartridge.

Figure 16:
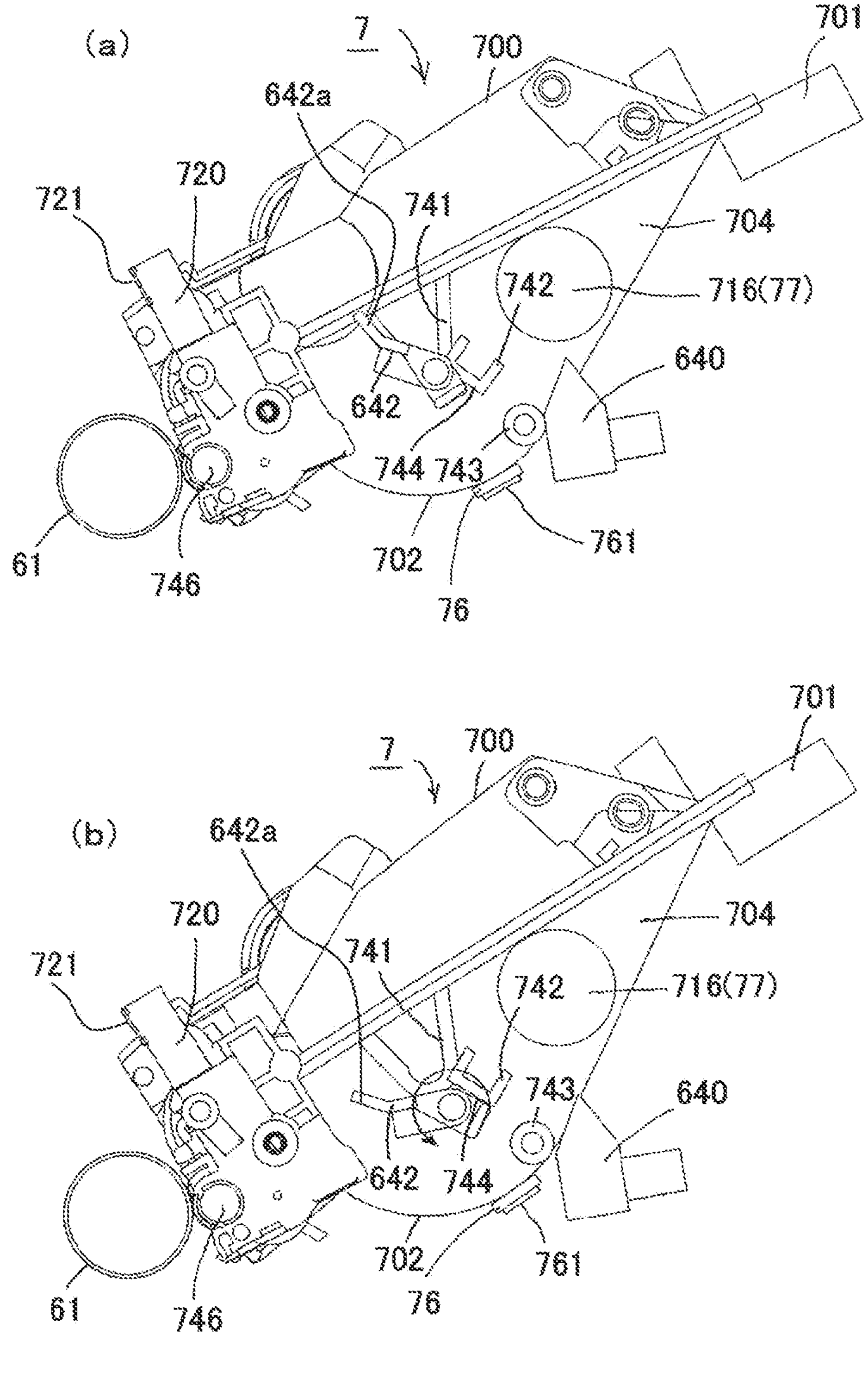

FIG. 16 parts (a) and (b) are drawings for describing the method for installing an example of modified version of process cartridge in the first embodiment, into the photosensitive member cartridge, and also, the method for uninstalling the modified version from the photosensitive member cartridge.

DESCRIPTION OF THE EMBODIMENTS

Embodiment 1

Next, the first embodiment of the present invention is described in detail with reference to appended drawings.

<Overall Structure of Image Forming Apparatus>

Figure 1:
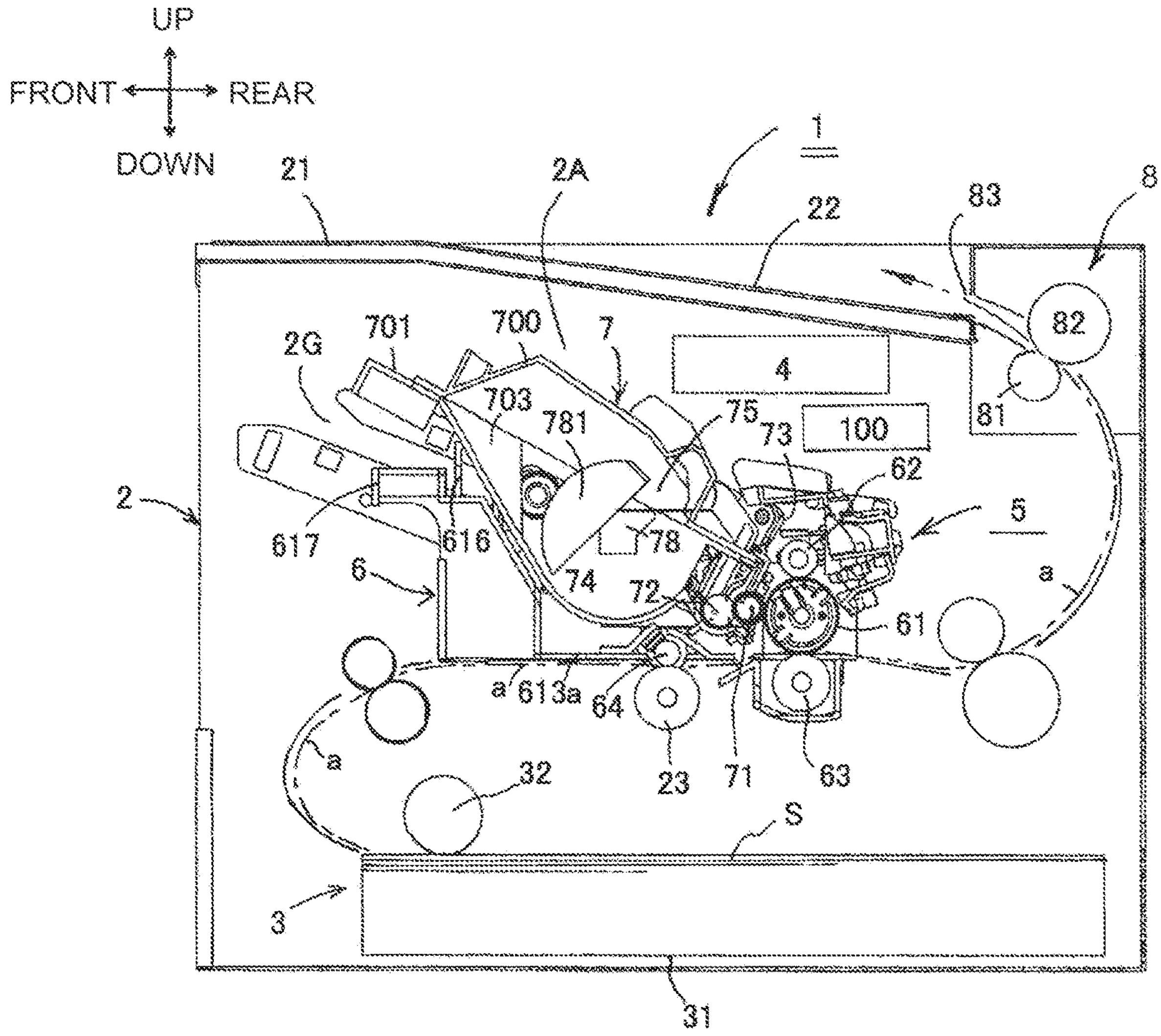
FIG. 1 is a schematic drawing of an example of typical image forming apparatus to which the present invention is applicable.

FIG. 1 is a sectional drawing of the image forming apparatus 1 in this embodiment. It shows the general structure of the apparatus 1. The image forming apparatus 1 is a laser printer which uses an electrophotographic image formation process. It is capable of forming on a sheet of recording medium (which hereafter may be referred to as recording paper), a toner image which is in accordance with electrical information (image data) inputted to the controlling section 100 of the apparatus 1 from a host device (unshown) such as a PC (personal computer).

In the following description of the image forming apparatus 1, the orientation of the image forming apparatus 1 is based on the position of a user of the apparatus 1. More concretely, referring to FIG. 1, the left and right sides are referred to as “front” and “rear” sides, respectively, and the “front” and “rear” sides are referred to as “right and left” sides, respectively. Also referring to FIG. 1, the “top-bottom” direction is referred to as the vertical direction.

Primarily, this image forming apparatus 1 comprises: a sheet feeding section 3 for feeding a sheet S of recording paper into the main assembly 2 of the apparatus 1; an exposing device 4 (laser scanner); a process cartridge 5 which transfers a toner image onto a sheet S of recording paper; and a fixing device 8 which thermally fixes the toner image transferred onto the sheet S.

The sheet feeding section 3 is disposed in the bottom portion of the apparatus main assembly 2. Primarily, it is provided with a sheet feeding tray 31 and a sheet feeding mechanism 32. Sheets S of recording medium stored in the sheet feeding tray 31 are conveyed one by one toward the interface (transfer nip) between the photosensitive drum 61 in the process cartridge 5, and a transfer roller 63 (transferring member).

The exposing device 4 is disposed in the top portion of the apparatus main assembly 2. It is provided with a laser light emitting section, a polygon mirror, lenses, a deflection mirror, etc., (which are unshown). The peripheral surface of the photosensitive drum 61 is exposed by the exposing device 4; the peripheral surface of the photosensitive drum 61 is scanned at a high speed by a beam of laser light emitted by the laser light emitting section while being modulated with the data of an image to be formed. The process cartridge 5 is disposed below the exposing device 4.

Figure 2:
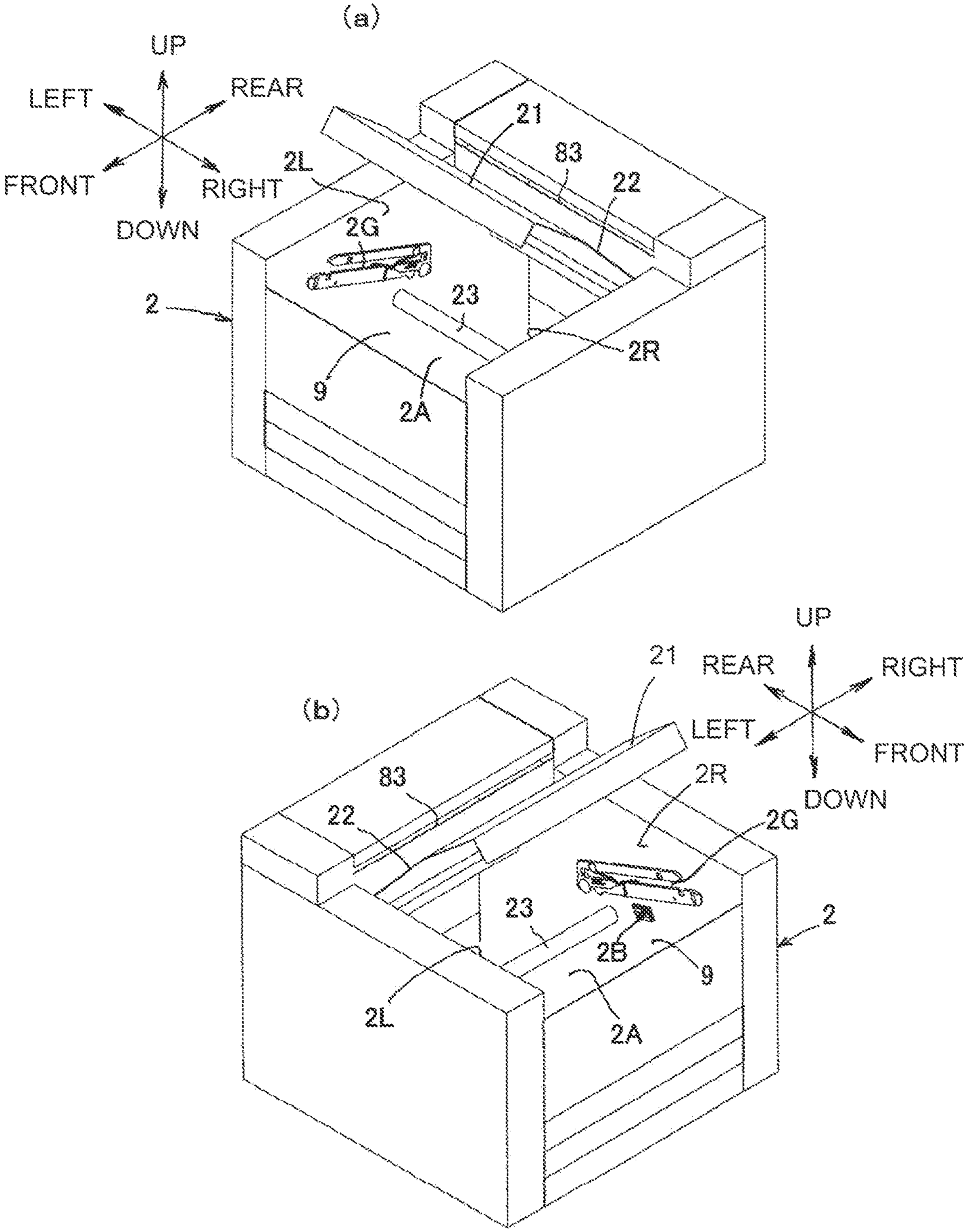
FIG. 2 is a perspective view of the main assembly of the image forming apparatus, shown in FIG. 1, when the cartridge installation (removal) door of the main assembly is open.

Referring to FIG. 2, the process cartridge 5 is installable in the apparatus main assembly 2. More concretely, the apparatus main assembly 2 is provided with a door 21. The process cartridge 5 is installable into the apparatus main assembly 2 through the opening 9 of the apparatus main assembly 2, which is exposed as the door 21 is opened. Further, the process cartridge 5 can be extracted from the apparatus main assembly 2 through the opening 9.

The apparatus main assembly 2 is provided with left and right lateral plates 2L and 2R, and a pair of cartridge guides 2G which correspond one for one in position to the left and right lateral plates 2L and 2R. Regarding the installation and uninstallation of the process cartridge 5, into or from, the process cartridge chamber 2A, a user is to engage the left and right ends (unshown sections by which process cartridge 5 is guided) of the process cartridge 5 into the left and right guiding sections 2G, respectively, and push the process cartridge 5 inward of the apparatus main assembly 2. As the process cartridge 2 is pushed, it slides into the process cartridge chamber 2A.

Figure 3:
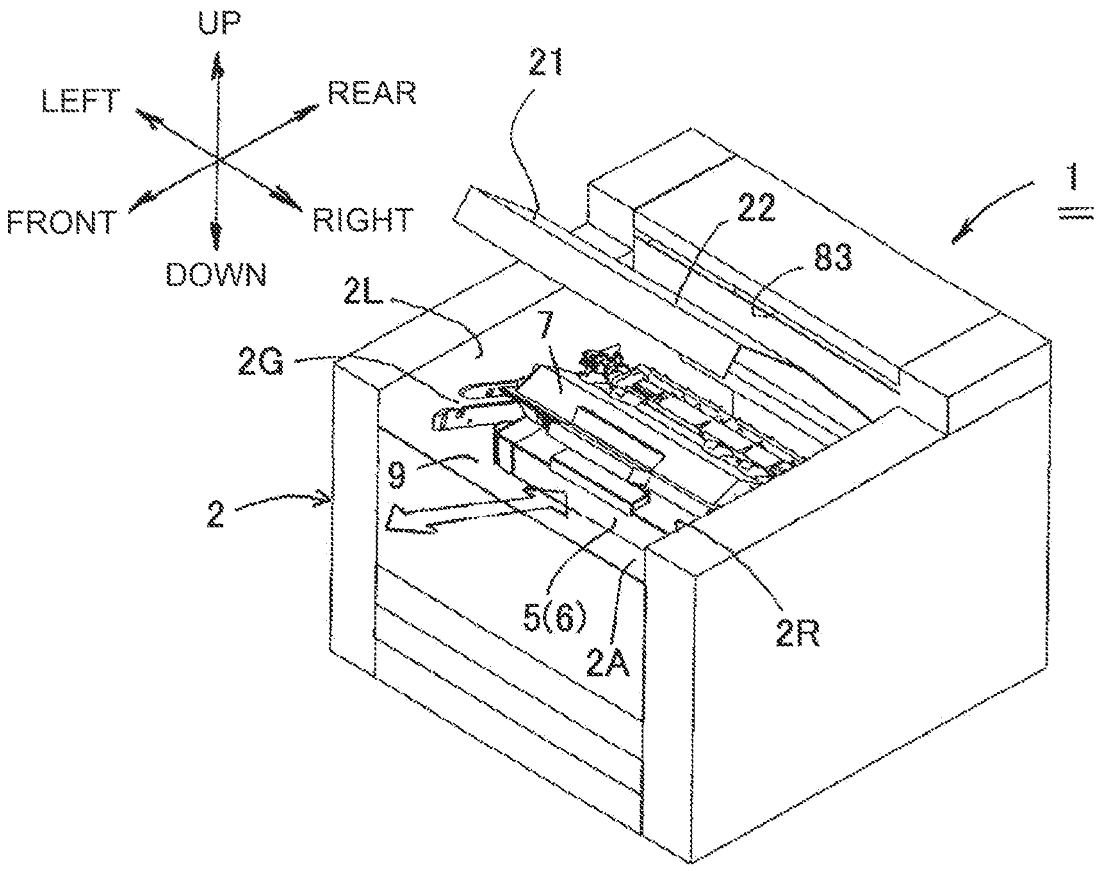
FIG. 3 is a perspective view of the main assembly of the image forming apparatus, shown in FIG. 1, when a process cartridge is properly set in the main assembly, and the cartridge installation (removal) door of the main assembly is open.

FIG. 3 shows the state of the process cartridge 5 after the installation of the process cartridge 5 into the cartridge chamber 2A of the apparatus main assembly 2. As the door 21 is closed, as shown in FIG. 1, after the installation of the process cartridge 5, the image forming apparatus 1 is readied for an image forming operation. Referring to FIG. 3, a two-headed white arrow indicates the direction in which the process cartridge 5 is to be installed into, or uninstalled from, the apparatus main assembly 2.

Each of parts (a) and (b) of FIG. 4A is a sectional view of the process cartridge 5. The process cartridge 5 comprises a photosensitive member cartridge 6 and a development cartridge 7. FIG. 4B is a combination of a sectional view of the development cartridge 7, at a plane perpendicular to the lengthwise direction of the development cartridge 7, as seen from the left side of the development cartridge 7 after its removal from the photosensitive member cartridge 6, and a sectional view of the photosensitive member cartridge 6, at a plane perpendicular to the lengthwise direction of the photosensitive member cartridge 6, after the removal of the development cartridge 7 from the photosensitive member cartridge 6.

Primarily, the photosensitive member cartridge 6 is provided with the photosensitive drum 61, a charge roller 62, a transfer roller 63, and a pinch roller 64. The development cartridge 7 is removably installable into the development cartridge chamber 6A of the photosensitive member cartridge 6. The structure of each of the photosensitive member cartridge 6 and development cartridge 7, and how the development cartridge 7 is to be installed into, or removed from, the photosensitive member cartridge 6, will be described later. Primarily, the development cartridge 7 is provided with a development roller 71 (developer bearing member), a supply roller 72, a thickness regulation blade 73, a toner storing section 74 in which toner (developer) is stored, and an agitator 75 which is an example of stirring member placed in the toner storage section 74.

In the process cartridge 5, the peripheral surface of the photosensitive drum 61 is uniformly charged by the charge roller 62. Then, it is exposed; it is scanned at a high speed by a beam of laser light emitted from the exposing device 4. Consequently, an electrostatic latent image, which is in accordance with the data of an image to be formed, is effected on the peripheral surface of the photosensitive drum 61.

The toner in the toner storage section 74 is agitated by the agitator 75, and then, is supplied to the development roller 71 by way of the supply roller 72. Then, as the development roller 71 is rotated, the toner on the peripheral surface of the development roller 71 is conveyed between the development roller 7 and the thickness regulation blade 73. Consequently, a thin layer of toner, which has a preset thickness, is formed on the peripheral surface of the development roller 71.

The toner borne on the peripheral surface of the development roller 71 is supplied from the development roller 71 to the electrostatic latent image formed on the peripheral surface of the photosensitive drum 61. Consequently, the electrostatic latent image is developed into a visible image (image formed of toner, which hereafter is referred to as toner image). Then, the toner image on the peripheral surface of the photosensitive drum 61 is transferred onto a sheet S of recording paper while the sheet S is conveyed through the transfer nip, which is the area of contact between the photosensitive drum 61 and transfer roller 63, while remaining pinched by the photosensitive drum 61 and transfer roller 63.

The fixing device 8 is disposed in the apparatus main assembly 2. It is disposed on the rear side of the process cartridge chamber 2A. Primarily, it is provided with a heat roller 81 and a pressure roller 82. This fixing device 8 thermally fixes the toner image transferred onto a sheet S of paper, to the sheet S; the sheet S bearing the toner image is conveyed through the fixation nip, which is the area of contact between the heat roller 81 and pressure roller 82, the toner image is thermally fixed to the sheet S. After the fixation of the toner image to the sheet S, the sheet S is discharged into a delivery tray 22, which is a part of the top surface of the aforementioned door 21, through a sheet outlet 83.

Referring to FIG. 1, a single-dot chain line indicates the path through which the sheet S is conveyed from the sheet feeding section 3 to the delivery tray 22.

<Details of Process Cartridge Structure>

As described above, the process cartridge 5 is provided with the photosensitive member cartridge 6, and the development cartridge 7 which is removably mountable in the photosensitive member cartridge 6.

First, the development cartridge 7 is described in detail about its structure. The development cartridge 7 has a housing 700 as its frame, and a handle 701, which is to be grasped by a user. The handle 701 is a part of the housing 700, and is located on the front side of the housing 700. The aforementioned development roller 71 is in the rear portion of the housing 700, and is rotatably supported by the housing 700.

FIG. 5 is a sectional view of the development cartridge 7, at a plane (5)-(5) in FIG. 4B. Referring to FIG. 5, one (right end) of the lengthwise ends (in terms of direction parallel to axial line of development roller 7) is fitted with a development roller gear 714, through which the development roller 7 receives driving force. As the door 21 is closed after the installation of the process cartridge 5 into the process cartridge chamber 2A, a driving force transmitting member (unshown) of the apparatus main assembly 2 is engaged with the driving force receiving gear 714 by the movement of the door 21.

Thus, driving force is transmitted from the driving force transmitting member to the driving force receiving gear 714, whereby the development roller 71 is rotationally driven. The development cartridge 7 is structured so that when driving force is transmitted from the driving force transmitting member to the driving force receiving gear 714, a certain amount of positional deviation is tolerated between the driving force transmitting member and driving force receiving gear 714, within a preset range.

The development cartridge 7 is provided with a storing means 76 (memory), which is attached to the bottom surface 702 of the housing 700, that is, the surface of the housing 700, which faces the toner storage section 74. The storing means 76 (memory) stores information, for example, amount of toner in the development cartridge 7, which is useful to ensure that the development cartridge 7 is replaced with proper timing. From the standpoint of performance and cost, an IC chip of the contact type is used as the storing means 76 (memory).

The development cartridge 7 is provided with a mechanism for preventing the development cartridge 7 from being inserted into a wrong photosensitive member cartridge 6, that is, a photosensitive member cartridge 6 which is incompatible with the development cartridge 7. More specifically, referring to FIG. 1, part (b) of FIG. 4A, FIG. 5, and so on, the front portion of the housing 700 is provided with a recess 703, which recesses into the toner storage section 74. On the other hand, the housing of the photosensitive member cartridge 6 is provided with a protrusion 616 (FIGS. 1, part (b) of FIG. 4A and FIG. 7), which fits into the above described recess 703 of the development cartridge 7 as the development cartridge 7 is installed into the photosensitive member cartridge 6.

That is, the development cartridge 7 and photosensitive member cartridge 6 are structured so that if a combination of the development cartridge 7 and photosensitive member cartridge 6 is such that the protrusion 616 of the housing of the photosensitive member cartridge 6 does not fit into the recess 703 of the housing 700 of the development cartridge 7, the development cartridge 7 cannot be installed into the photosensitive member cartridge 6. With the provision of this structural arrangement, it is ensured that only the development cartridge 7 which is compatible with the photosensitive member cartridge 6 is installed into the photosensitive member cartridge 6.

Referring to FIG. 5, the left wall 704 of the housing 700 of the development cartridge 7 is provided with an opening 77 (toner inlet) through which the development cartridge 7 is filled with toner. Further, the toner inlet 77 is fitted with a cap 716 for keeping toner sealed in the development cartridge 7. From the standpoint of reducing the development cartridge 7 in size as much as possible, the development cartridge 7 is structured so that, in terms of the direction parallel to the axial line of the development roller 71, the toner inlet 77 and the aforementioned recess 703 of the housing 700 overlap with each other.

Thus, the greater the distance between the toner inlet 77 and recess 703 is made, the more efficiently the development cartridge 7 can be filled up with toner. It became evident from intensive studies that as long as ratio (D2/D1) of the distance D2 from the outer edge of the opening of the toner inlet 77 to the recess 703, to the external diameter D1 of the toner inlet 77 is no less than 1.45, the development cartridge 7 can be efficiently filled with toner. In this embodiment, therefore, D1 and D2 were set to 15.0 mm and 22.5 mm, respectively.

The development cartridge 7 is structured so that the agitator 75 is rotated by the stirring gear 715, to which driving force is transmitted from the driving force reception gear 714 (FIG. 5) through an idler gear (unshown). The toner in the toner storage section 74 is stirred by the agitator 75, and then, is supplied to the development roller 71 by way of the supply roller 72.

Referring to FIG. 6, the agitator 75 is primarily made up of a toner stirring rod 78, and a toner stirring sheet 79. In order to adjust the toner stirring sheet 79 in the amount by which the toner stirring sheet 79 can supply the toner in the toner storage section 74 to the supply roller 72, the toner stirring sheet 79 is provided with multiple holes 791, which are aligned in the lengthwise direction of the toner stirring sheet 79, with preset intervals.

Referring to part (d) of FIG. 6, the development cartridge 7 is structured so that, as the hole 791 and recess 703 are seen from the direction parallel to the axial line of the development cartridge 7, the edge of the hole 791 overlaps with the wall of the recess 703. If the toner stirring sheet 79 remains in contact with the wall of the recess 703 for an extended length of time, it sometimes deforms. As the toner stirring sheet 79 deforms, it sometimes partially reduces in the amount by which it can supply the toner in the toner storage section 74 to the supply roller 72, in terms of the direction parallel to the axial line of the supply roller 72.

Since the development cartridge 7 in this embodiment is structured as described above (part (d) of FIG. 6), it is possible to reduce the force by which the toner stirring sheet 79 is deformed while it is in contact with the wall of the recess 703. Therefore, the toner stirring sheet 79 in this embodiment is smaller in the amount of deformation which occurs with the elapse of time. Thus, it is stable in the amount by which it supplies the toner in the toner storage section 74 to the supply roller 72.

The toner stirring rod 78 is provided with multiple stirring blades 781 for conveying the toner in the toner storage section 74 toward the center of the toner storage section 74 in terms of the lengthwise direction of the toner storage section 74. Each stirring blade 781 is shaped like a half of an old Japanese gold piece (cut along its long axis; which hereafter may be referred to as semi-oval stirring blade). As the supply roller 72 rubs against the development roller 71, the toner on the peripheral surface of the supply roller 72 is rubbed by the peripheral surface of the development roller 71. Thus, a certain amount of the toner on the peripheral surface of the supply roller 72 is dislodged from the peripheral surface of the supply roller 72, and is conveyed toward the lengthwise ends of the toner storage section 74. As the toner is conveyed to the lengthwise ends of the toner storage section 74, it has to be returned to the center portion of the toner storage section 74. This is why the toner stirring rod 78 is provided with the above described semi-oval stirring blades 781.

The toner stirring rod 78 is provided with multiple semi-oval stirring blades 781, which are aligned in the lengthwise direction of the toner stirring rod 78. In this embodiment, the toner stirring rod 78 is provided with six semi-oval stirring blades 781. The development cartridge 7 is structured so that as the development cartridge 7 is seen from its lengthwise direction, the tip of each of the two semi-oval stirring blades 781 which are at the lengthwise ends, overlaps with the wall of the recess 703. Because the development cartridge 7 is structured as described above, the toner which is between the lateral wall of the toner storage section 74 and the wall of the recess 703 can be efficiently conveyed to the center portion of the toner storage section 74.

Next, the details of the structure of the photosensitive member cartridge 6 are described. Referring to FIGS. 4A, 4B, 7, etc., the photosensitive member cartridge 6 has a bottom frame 610 and a top frame 620.

Primarily, the bottom frame 610 has a left wall 611, a right wall 612, and a bottom wall 613 which extends in the direction parallel to the axial line of the photosensitive drum 61. The left and right walls 611 and 612 oppose each other, and are in connection to each other by their bottom edge, through the bottom wall 613. Their front sides are in connection to each other through the front wall 614, whereas their rear sides are in connection to each other through the rear wall 615. Further, bottom frame 610 is provided with a handle 617, which is positioned on the front side of the bottom frame 610 to be grasped by a user when the user wants to hold the photosensitive member cartridge 6.

The photosensitive drum 61 is rotatably supported by the rear portion of the left wall 611, and the rear portion of the right wall 612. As the process cartridge 5 is inserted into the apparatus main assembly 2, the driving gear (unshown) of the apparatus main assembly 2 engages with the photosensitive member gear 65, with which one of the lengthwise ends of the photosensitive drum 61 is fitted, whereby the photosensitive drum 61 is enabled to be rotationally driven. Further, referring to part (a) of FIG. 8, the driving force is transmitted from the photosensitive member gear 65 to the transfer gear 66 to rotate the transfer roller 63.

By the way, as an example of modified version of the structural arrangement for making the photosensitive drum 61 rotatable, the photosensitive member cartridge 6 may be structured so that driving force is transmitted to the photosensitive drum 61 by way of a connective member (unillustrated). In the case of such a structural arrangement, as the door 21 with which the apparatus main assembly 2 is provided is closed, the connective member is made to engage with the drum driving force transmitting member by the movement of the door 21, making it possible for driving force to be transmitted from the drum driving force transmitting member to the connective member, whereby the photosensitive drum 61 is rotationally driven. In the case of this structural arrangement, the drum driving force transmitting member is enabled to transmit driving force to the drum driving force input section, while affording a positional deviation between itself and connective member, within a preset range.

The photosensitive member cartridge 6 is structured so that the left wall 611, right wall 612, and connective wall 615 are connected in a pattern of a letter U to surround the left, right, and rear of the photosensitive drum 61, respectively. The development cartridge 7 is removably installable into the development cartridge chamber 6A of the photosensitive member cartridge 6, that is, the space surrounded by the left wall 611, right wall 612, front wall 614, and photosensitive drum 61.

The right wall 612 of the bottom frame 610 is provided with a first electrical contact 631 (FIG. 7), which establishes electrical connection with the electrical contact 2B (part (b) of FIG. 2) of the apparatus main assembly 2 as the process cartridge 5 is inserted into the process cartridge chamber 2A of the apparatus main assembly 2.

Further, the photosensitive member cartridge 6 is provided with a second electrical contact 632, which is attached to the inward side of the bottom wall 613 of the bottom frame 610. This contact 632 establishes electrical connection with the electrical contact 761 of the storing means 76 (memory), with which the bottom surface 702 (which opposes toner storage section 74) of the housing 700, as the development cartridge 7 is inserted into the development cartridge chamber 6A of the photosensitive member cartridge 6 (part (a) of FIG. 4A and FIG. 10).

The first and second electrical contacts 631 and 632 are in electrical connection to each other through wiring 633 (FIG. 7). Therefore, as the process cartridge 5 is inserted into the process cartridge chamber 2A of the apparatus main assembly 2, electrical connection is established between the electrical contact 2B of the apparatus main assembly 2, and the storing means 76 (memory) of the development cartridge 7, through the first electrical contact 631, wiring 633, second electrical contact 632, and electrical contact 761, whereby electrical connection is established between the controlling section 100 (FIG. 1) of the apparatus main assembly 2 and the storing means 76 (memory), enabling the controlling section 100 to properly control the image forming apparatus 1 based on the information stored in the storing means 76 (memory).

In this embodiment, it is the right wall 612 of the bottom frame 610 that is provided with the first electrical contact 631. However, the shorter the distance between the first electrical contact 631 and second electrical contact 632, the lower the cost of the photosensitive member cartridge 6. Therefore, it is advantageous for the second electrical contact 632 also to be mounted on the wall which is closer to the electrical contact 2B of the apparatus main assembly 2. Thus, in this embodiment, the second electrical contact 632 is attached to a portion of the bottom wall 613 of the bottom frame 610, which is closer to the right wall 612 than the center of the bottom wall 613 in terms of the lengthwise direction.

Because the electrical contact 2B of the apparatus main assembly 2 and the storing means 76 (memory) of the development cartridge 7 is connected through the bottom frame 610, which is a part of the frame of the photosensitive member cartridge 6, as described above, the electrical contact 2B of the apparatus main assembly 2 does not need to be complicated, or large.

Moreover, it is the bottom wall 613 that is provided with the second electrical contact 632. Therefore, the photosensitive member cartridge 6 in this embodiment is smaller in dimension in terms of its lengthwise direction than a photosensitive member cartridge 6 having the second electrical contact 632 on its right wall 612 or left wall 611. Therefore, the process cartridge 5 can be smaller in dimension in terms of its lengthwise direction. By the way, the first electrical contact 631 may be attached to the left wall 611. That is, it may be to one of the lengthwise ends of the frame of the photosensitive member cartridge 6, or the other, that the first electrical contact 631 is attached.

Conventionally, the bottom surface of a process cartridge is utilized to facilitate the conveyance of a sheet S of recording paper. Therefore, it is rather difficult to attach the storing means 76 (memory) to the bottom surface of a process cartridge. Attaching the storing means 76 (memory) to a portion of the process cartridge other than the bottom surface increases the dimension of the process cartridge in terms of its lengthwise direction.

In comparison, in the case of the process cartridge 5 in this embodiment, a part of the bottom surface of the bottom wall 613 of the photosensitive member cartridge 6 is utilized as a recording medium conveyance surface 613*a*. Therefore, the storing means 76 (memory) can be attached to the bottom surface 702 of the development cartridge 7.

Referring to part (a) of FIG. 8, primarily, the top frame 620 is made up of the top wall 621, and left and right walls 622 and 623, which extend downward from the left and right ends, respectively, of the top wall 621. This top frame 620 supports a charging device 622 (charger). It is attached to the bottom frame 610 in a manner to cover, from above, the photosensitive drum 61 surrounded by the left and right walls 622 and 623, and the connective wall 615 (FIG. 7) of the bottom frame 610.

Also referring to part (a) of FIG. 8, each of the left and right walls 622 and 623 of the top frame 620 is provided with a regulating section 624 which regulates the movement of the drum shaft 67 (which supports the photosensitive drum 61) in the lengthwise direction of the shaft 67.

Next, referring to part (b) of FIG. 8, a method for assembling the photosensitive drum 61 is described. First, the photosensitive drum 61 is to be set in the bottom frame 610. Then, the top frame 620 is to be attached to the bottom frame 610 in a manner to cover, from above, the photosensitive drum 61. Lastly, the drum shaft 67 is to be inserted in the direction parallel to the axial line of the photosensitive drum 61.

Each of the left and right walls 611 and 612 of the bottom frame 610 is provided with a drum shaft hole 617, which determines the position of the photosensitive drum 61 relative to the bottom frame 610 in terms of the radius direction of the photosensitive drum 61. One (left) of the lengthwise ends of the photosensitive drum 61 is provided with a drum flange 68, which is provided with a hole 681 for determining the position of the rotational axis of the photosensitive drum 61 (part (b) of FIG. 8). The other lengthwise end of the photosensitive drum 61 is fitted with the photosensitive drum gear 65, which is provided with a hole 651. The photosensitive drum 61 is rotatably supported by the bottom frame 610, with the presence of the drum shaft 67 between itself and bottom frame 610. Further, the photosensitive drum 61 is precisely positioned relative to the bottom frame 610 by the drum shaft 67.

Next, referring to part (a) of FIGS. 9 and 9(*b*), the drum shaft 67 is provided with a pair of grooves 671, which are near the lengthwise ends of the drum shaft 67, one for one. As the regulating sections 624, with which the left and right walls 622 and 623 of the top frame 620 are provided, engage into the grooves 671, not only is the top frame 620 fixed to the bottom frame 610, but also, it becomes impossible for the drum shaft 67 to slip out of the photosensitive member cartridge 6 in its lengthwise direction. By the way, the top frame 620 supports the drum shaft 67 by three points of its regulating section 624.

The regulating section 624 has: a hole 624*a* through which the drum shaft 67 is inserted; three supporting sections 624*b*, which are on the inward surface of the hole 624*a*, being separated with equal intervals; and an elastic tong-like section 624*c*. As the drum shaft 67 is inserted into the hole 624*a*, it is supported by the three supporting sections 624*b* of the regulating section 624. Further, the tip of each of the elastic tong-like sections 624*c* fits into the corresponding groove 671 of the drum shaft 67. Thus, the drum shaft 67 is locked to the regulating section 624.

Although FIG. 9 shows only the regulating section 624 of the right wall 623, the regulating section 624 of the left wall 622 is the same as the regulating section 624 of the right wall 623. That is, the pair of regulating sections 624, with which the left and right walls 622 and 623 of the top frame 620 are provided, fit into the pair of grooves 671, with which the left and right ends of the drum shaft 67 are provided, respectively. The regulating sections 624 are integral parts of the top frame 620. They are molded of resinous substance.

Referring to part (a) of FIG. 10, the photosensitive member cartridge 6 is provided with a pinch roller 64, which is disposed in the bottom portion of the bottom frame 610. The pinch roller 64 is positioned so that as the process cartridge 5 is inserted into the process cartridge chamber 2A of the apparatus main assembly 2, the pinch roller 64 directly opposes a registration roller 23, with which the apparatus main assembly 2 is provided. Further, the bottom frame 610 is provided with a paper dust removal pad 69, which is positioned to oppose the pinch roller 64. The pinch roller 64 is rotationally driven in the clockwise direction indicated by an arrow mark, by the registration roller 23 which is rotated in the counterclockwise direction indicated by another arrow mark. As it is rotated, it conveys a sheet S of recording paper to the interface between the photosensitive drum 61 and transfer roller 63.

Next, referring to part (b) of FIG. 10, the process cartridge 5 is structured so that when the process cartridge 5 is out of the apparatus main assembly 2, the pinch roller 64 remains unfixed in position, and also, so that as the photosensitive member cartridge 5 is installed into the apparatus main assembly 2, not only is it moved into a preset position, and remains in the position, but also, it is placed in contact with the paper dust removal pad 69 (part (a) of FIG. 10).

Thus, paper dust from a sheet S of recording paper adheres to the pinch roller 64. It is desired that paper dust from a sheet S of recording paper adheres to the peripheral surface of the photosensitive drum 61 as little as possible, in particular, in the case of an image forming apparatus of the so-called cleaner-less type. This is why the photosensitive member cartridge 6 is provided with the paper dust removal pad 69 for removing the paper dust from the pinch roller 64.

The paper dust removal pad 69 is attached to the bottom wall 613 of the bottom frame 610. It is positioned so that it directly opposes the pinch roller 64. More concretely, it is positioned so that it remains in contact with an area of the upstream half of the peripheral surface of the pinch roller 64, in terms of the recording paper conveyance direction, relative to a vertical line H, which coincides with the center of the pinch roller 64.

Because the process cartridge 5 is structured as described above, the paper dust removal pad 69 can efficiently recover the paper dust from a sheet S of recording paper, which is on the pinch roller 64. The surface layer of the paper dust removal pad 69 is made of urethane foam, silicon foam, unwoven cloth, bristle, or the like. It is structured to remove the paper dust from a sheet S of recording paper, and retain the paper dust.

Next, a method for installing the development cartridge 7 into the photosensitive member cartridge 6, and a method for uninstalling the process cartridge 7 from the photosensitive member cartridge 6, are described. When the development cartridge 7 is brand-new, it has a development roller cover 710 as shown in part (a) of FIG. 11. First, therefore, the development roller cover 710 has to be removed. The development roller cover 710 is for preventing such incidence that when the development cartridge 7 is unpackaged, a user accidentally touches the peripheral surface of the development roller 71 by hand, and/or damages the peripheral surface of the development roller 71.

Generally speaking, polypropylene or the like resinous substance is used as the material for the development roller cover 710. The development cartridge 7 is desired to be as small as possible in cross-section, prior to the removal of the development roller cover 710, because the smaller it is in cross-section, the smaller the development cartridge shipment box can be, and therefore, the more efficiently it can be shipped.

Therefore, the development roller cover 710 is provided with an inward crease 711 (inwardly protruding section), to make as small as possible, the distance between the development roller cover 710 and development roller 71 while increasing the development roller cover 710 in rigidity. In this embodiment, the distance is 4 mm.

Further, in order to prevent the above described crease 711 from coming into contact with the peripheral surface of the development roller 71 when the development roller cover 710 is removed from the development cartridge 7, the following structural arrangement is adopted.

The development roller cover 710 has: a latch 712, which is at the center of the development roller cover 710 in terms of the lengthwise direction of the development roller cover 710; and a pair of protrusions 713, which are located near the lengthwise ends of the development roller cover 710, one for one. The latch 712 engages with a part 730*a* (part (a) of FIG. 12) of a regulation blade unit 730 which supports the thickness regulation blade 73, whereas the protrusions 713 engage with parts 706 (part (b) of FIG. 12) of the bottom wall 702 of the development cartridge 7, whereby the development roller cover 710 becomes fixed to the development cartridge 7.

Referring to part (a) of FIGS. 12 and 12(*b*), the bottom wall 702 of the development cartridge 7 is provided with a cartridge movement regulating section 707 which prevents the crease 711 from coming into contact with the peripheral surface of the development roller 71 when the development roller cover 710 is removed from the development cartridge 7.

The latch 712, which is at the center portion of the development roller cover 710, is to be disengaged from the part 730*a* of the regulation blade unit 730, by deforming the center portion of the development roller cover 710. During this process, the development roller cover movement regulating section 707 functions as a pivot, about which the development roller cover 710 is rotationally moved to be separated from the development cartridge 7.

That is, when the development roller cover 710 is removed from the development cartridge 7, it is rotationally moved about the development roller cover movement regulating section 707, as indicated by a double-dot chain line in part (a) of FIG. 12. Therefore, the crease 711 does not come into contact with the peripheral surface of the development roller 71. That is, the development roller cover 710 is removed from the development cartridge 7 by being rotationally moved about the development roller cover movement regulating section 707 in the direction which is perpendicular to the axial line of the development roller 71. Part (b) of FIG. 12 is a perspective view of the development cartridge 7 after the development roller cover 710 was removed through the above described procedure.

After the removal of the development roller cover 710, the development cartridge 7 is installed into the development cartridge chamber 6A of the photosensitive member cartridge 6 through the following steps.

A user is to grasp the handle 701 which is at the front end of the development cartridge 7, and insert the development cartridge 7 into the development cartridge chamber 6A of the photosensitive member cartridge 6, from the development roller side of the development cartridge 7. If an excessive amount of force is applied to the photosensitive member cartridge during this process, it is possible that the development roller 71 and/or regulation blade unit 730 will come into contact with the peripheral surface of the photosensitive drum 61, scarring sometimes the peripheral surface of the photosensitive drum 61.

Referring to FIG. 13, in this embodiment, therefore, the process cartridge 5 is structured so that when the process cartridge 7 is inserted into the development cartridge chamber 6A of the photosensitive member cartridge 6, a part of each of the side covers 720 which make up the left and right end portions (lengthwise ends of housing 700), one for one, of the process cartridge 7, first comes into contact with the top frame 620 of the photosensitive member cartridge 6.

That is, the process cartridge 5 is structured so that a part of each of the side covers 720 which are at the left and right ends (lengthwise ends of housing 700) functions as a developer cartridge positioning section 721 (photosensitive member cartridge contacting section), and also, so that a part of each of the left and right ends of the top frame 620 of the photosensitive member cartridge 6 functions as a development cartridge catching section 625 (FIG. 7), which corresponds to the abovementioned photosensitive member cartridge contacting section 721.

The left and right side covers 72 are attached to the left and right walls 704 and 705 of the housing 700, with the use of small screws. Not only do they cover the gears 714 and 715, etc., which are on the right wall of the housing 700, but also, support (bear) the development roller 7 and supply roller 72 by their left and right ends.

The procedure for a user to install the development cartridge 7 into the photosensitive member cartridge 6 is as follows: First, a user is to grasp the development cartridge 7 so that the development roller 71 faces downward. Then, the user is to place the left and right photosensitive drum cartridge contacting sections 721 in contact with the left and right process cartridge catching sections 625, one for one. Then, the user is to rotate the development cartridge 7 into the development cartridge chamber 6A of the photosensitive member cartridge 6.

Referring to part (a) of FIGS. 14, 14(*b*) and 14(*c*) which shows the steps through which the process cartridge 7 is to be installed into the photosensitive member cartridge 6, as the development cartridge 7 is rotated as described above, the process cartridge 7 pivots into the development cartridge chamber 6A of photosensitive member cartridge 6, with the area of contact between the development cartridge catching section 625 and photosensitive member cartridge contacting section 721 functioning as a pivot. The process cartridge 5 is structured so that when the development cartridge 7 is rotationally installed into the photosensitive member cartridge 6, the development roller 71 and regulation blade unit 730 do not come into contact with the peripheral surface of the photosensitive drum 61. Further, the process cartridge 5 is structured so that toward the end of the installation of the process cartridge 7 into the photosensitive member cartridge 6, the photosensitive member cartridge contacting section 720 separates from the process cartridge catching section 625.

As the development cartridge 7 is rotationally moved relative to the photosensitive member cartridge 6 by a substantial amount (part (c) of FIG. 14), the left and right ends of the rotational shaft 746 of the development roller 71 are caught by the development roller bearing sections 641 of the left and right wall 611 and 612. Further, a pair of protrusions 743, with which the left and right walls 704 and 705 of the housing 700 are provided, one for one, engage with a pair of pivotal arms 640, with which the left and right sides of the bottom frame 610 of the photosensitive member cartridge 6 are provided, respectively, and are pressed downward by the pivotal arms 640.

Part (a) of FIG. 15 shows the state of the process cartridge 7, in which the protrusion 743 is under the pressure from the pivotal arm 640, and therefore, the development cartridge 7 is retained in the development cartridge chamber 6A, in a preset manner. When the process cartridge 7 is in the state shown in part (a) of FIG. 15, the electrical contact 761 of the storing means 76 (memory) with which the development cartridge 7 is provided, remains in contact with the second electrical contact 632, with which the bottom frame 610 of the photosensitive member cartridge 6 is provided (part (a) of FIGS. 4A 15.

After the installation of the development cartridge 7 into the photosensitive member cartridge 6, the process cartridge 5 is installed into the apparatus main assembly 2, through the opening 9 of the apparatus main assembly 2, which is exposed as the door 21 of the apparatus main assembly 2 is opened (FIGS. 2 and 3). As the process cartridge 5 is installed into the apparatus main assembly 2, electrical connection is established between the electrical contact 2B of the apparatus main assembly 2 and the storing means 76 (memory) of the development cartridge 7, by way of the first electrical contact 631, wiring 633, second electrical contact 632, and electrical contact 761.

Next, how the development cartridge 7 is to be removed from the photosensitive member cartridge 6 is described. Generally speaking, the development cartridge 7 of the process cartridge 5, which is installable in the photosensitive member cartridge 6 of the process cartridge 5, is shorter in life span than the photosensitive member cartridge 6.

Thus, as the development cartridge 7 reaches the end of its life span, it has to be replaced. In order to replace the development cartridge 7 in the photosensitive member cartridge 6, the process cartridge 5 has to be removed from the apparatus main assembly 2 through the opening 9 which is exposed as the door 21 is opened. Then, the development cartridge 7 having reached the end of its life span is removed from the photosensitive member cartridge 6 of the removed process cartridge 5. Then, a brand-new development cartridge 7 is installed. Then, the process cartridge 5 having the brand-new development cartridge 7 is installed into the apparatus main assembly 2.

Referring to part (a) of FIG. 15, the development cartridge 7 is provided with a protrusion 741 and a rib 742, which are on the left wall 704 of the housing 700. Further, the development cartridge 7 is provided with the pair of protrusions 743 which are on the left and right walls 704 and 705 of the housing 700.

The protrusion 741 is outwardly protrusive from the left wall 704. It is positioned so that its axis coincides with the rotational axis 75A of the agitator 75. The rib 742 is outwardly protrusive from the left wall 704 of the housing 700. It is like a protrusion formed of a thin plate. It has a surface 744 which faces toward the development roller 71. The rib 743 is on the front side of the rib 742. The development cartridge 7 is provided with a pair of ribs 742, which protrudes outward from the left and right side walls 704 and 705, one for one.

The photosensitive member cartridge 6 has: the bottom frame 610; photosensitive drum 61 rotatably supported by the rear portions of the bottom frame 610; and pivotal arms 640 which are examples of pressing member. The left and right walls 611 and 612 of the bottom frame 610 are provided with the bearing sections 641, which bear the rotational axle 746 of the development roller 71, and which are on the front side of the photosensitive drum 61. The bearing section 641 is roughly U-shaped in cross-section, and opens frontward. It bears the rotational axle of the development roller 71.

The pair of pivotal arms 640 are pivotally supported by the front portions of the left and right side walls 611 and 612 of the bottom frame 610. Further, the photosensitive member cartridge 6 is provided with a pair of coil springs (unshown), each of which is disposed on the front side of the pivot of corresponding pivotal arm 640 to keep the pivotal arm 640 pressured in the counterclockwise direction (part (a) of FIG. 15).

The amount of resiliency of the coil spring is set as follows. As a user presses the pressing area 642*a* of a development cartridge removal lever 642, the development cartridge removal lever 642 is rotated in the clockwise direction. Consequently, the development cartridge 7 is unlatched from the photosensitive member cartridge 6. The amount of resiliency of the coil spring is set so that as the development cartridge 7 becomes unlatched from the photosensitive member cartridge 6, the development cartridge 7 is made to pop up from the photosensitive member cartridge 6 in the development cartridge removal direction, by the force applied to the pivotal arm 640 by the coil spring.

In the case of this structural arrangement, when the development cartridge 7 is in the state shown in part (a) of FIG. 15, that is, before the development cartridge 7 is allowed to pop up, the distance between the pressing area 642*a* of the development cartridge removal lever 642 and rotational axle 746 of the development roller 71 is greater than the distance between the surface 744 and the rotational axle of the development roller 71.

The development cartridge removal lever 642 is attached to the right wall 612 of the photosensitive member cartridge 6. It is between the photosensitive drum 61 and pivotal arm 640, and is in the adjacencies of the front side of the protrusion 741 of the development cartridge 7, being enabled to be rotated in the clockwise direction. The development cartridge removal lever 642 is provided with the pressure application area 642*a*, which is to be pressed by a user.

Referring to part (b) of FIG. 15, the development cartridge removal lever 642 is to be moved upward along the surface 744 of the rib 742 of the housing 700, with the rotational axle 746 of the development roller 71 remaining supported by the bearing section 641. With this movement of the development cartridge removal lever 642, the development cartridge 7 can be moved out of the photosensitive member cartridge 6.

In recent years, it has been desired that the development cartridge 7 is further increased in yield. Thus, the development cartridge 7 has increased in weight. Thus, increasing the distance between the rotational axle 746 of the development roller 71 and the surface 744 of the rib 742 is beneficial from the standpoint of rotationally moving the development cartridge 7 upward.

In this embodiment, therefore, the rib 742 is positioned so that it coincides with a line which is intersectional to the line which connects the pressure application area 745 of the pressure catching rib 743, and the center of the protrusion 741, that is, the rotational axis 75A of the agitator 75. In other words, the rib 742 is in the area between the pressure catching section 745 and rotational axle 75A, in terms of the direction which is parallel to the line which connects the pressure catching section 745 and the rotational axle 75A.

Part (a) of FIG. 16 shows a modified version of development cartridge 7, which is opposite (counterclockwise) from the development cartridge 7 shown in FIG. 15, in the direction in which the development cartridge removal lever 642 is rotated. In the case of this structural arrangement, before the process cartridge 7 is in the state shown in part (a) of FIG. 16, that is, prior to the unlatching of the process cartridge 7 from the photosensitive member cartridge 6, the pressure application area 642*a* of the development cartridge removal lever 642 is closer to the rotational axle 746 than the surface 744. The development cartridge removal lever 642 may be positioned as shown in part (a) of FIG. 16, in consideration of the interference between the development cartridge removal lever 642, and the other sections of the development cartridge 7, apparatus main assembly 2, photosensitive member cartridge 6, etc.

Anyway, as the development cartridge 7 can be moved out of the photosensitive member cartridge 6 by rotating the development cartridge removal lever 642 by a preset amount to move the rib 742 of the housing 700 along the surface 744.

After the removal of the development cartridge 7 from the photosensitive member cartridge 6, a brand-new development cartridge 7 is to be installed into the photosensitive member cartridge 6.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-109757 filed on May 29, 2015, which is hereby incorporated by reference herein in its entirety.

What is claimed is:

1. A cartridge mountable to a main assembly of an image forming apparatus, the cartridge comprising:

a drum unit detachably mountable to the main assembly, the drum unit including a photosensitive drum, a frame, a contacted portion, and an urging portion, the photosensitive drum being rotatable about a rotational axis of the photosensitive drum, the frame including a first wall and a second wall opposite to the first wall with respect to a direction of the rotational axis of the photosensitive drum; and a developing unit including a developing roller rotatable about a rotational axis of the developing roller, a handle portion, a contacting portion disposed in a position different from the rotational axis of the developing roller and being configured to contact the contacted portion of the drum unit, and an urged portion urged by the urging portion of the drum unit, wherein the developing unit is mountable in a space between the first and second walls of the drum unit, wherein, while the developing unit is being mounted to the drum unit, in a posture in which the drum unit is mounted in the main assembly, the handle portion is moved downward in a direction of gravity and the developing unit is rotated in a state in which the contacting portion and the contacted portion are in contact with each other so that the developing roller is moved closer to the photosensitive drum, and wherein, in a state in which the developing unit is mounted to the drum unit, the urged portion of the developing unit is urged by the urging portion of the drum unit so that the developing roller and the photosensitive drum are in contact with each other.

2. The cartridge according to claim 1, wherein a position of the rotational axis of the developing roller is below in the gravity direction a position wherein the urging portion of the drum unit urges the urged portion of the developing unit.

3. The cartridge according to claim 1, wherein, when the developing unit is mounted to the drum unit in a posture in which the drum unit is mounted to the main assembly, a position of the rotational axis of the developing roller is caused to move from a first position to a second position that is closer to the rotational axis of the photosensitive drum than the first position is to the rotational axis of the photosensitive drum by rotation of the developing unit in a state in which the contacting portion of the developing unit is in contact with the contacted portion of the drum unit, and wherein, after moving from the second position to a third position in a state in which the drum unit is mounted to the main assembly, the developing unit is urged so that the developing roller and the photosensitive drum are in contact with each other by the urging portion of the drum unit urging the urged portion of the developing unit.

4. The cartridge according to claim 1, further comprising a memory configured to store information and including a memory electrical contact, wherein the memory is disposed below the contacting portion in the gravity direction.

* * * * *